United States Patent
Marti et al.

(10) Patent No.: US 8,510,138 B2
(45) Date of Patent: Aug. 13, 2013

(54) NETWORKED BARCODE VERIFICATION SYSTEM

(75) Inventors: Benjamin J. Marti, Gilbert, AZ (US);
Dennis A. Denker, Scottsdale, AZ (US);
Samuel Levin, Los Angeles, CA (US)

(73) Assignee: Ticketmaster LLC, West Hollywood, CA (US)

(*) Notice: Subject to any disclaimer, the term of this patent is extended or adjusted under 35 U.S.C. 154(b) by 507 days.

(21) Appl. No.: 12/716,616

(22) Filed: Mar. 3, 2010

(65) Prior Publication Data

US 2010/0228576 A1 Sep. 9, 2010

Related U.S. Application Data

(60) Provisional application No. 61/158,237, filed on Mar. 6, 2009.

(51) Int. Cl.
*G06Q 10/00* (2006.01)
*G06Q 50/00* (2006.01)

(52) U.S. Cl.
USPC .................................. 705/5; 705/37

(58) Field of Classification Search
USPC .................................. 705/5–6, 37
See application file for complete search history.

(56) References Cited

U.S. PATENT DOCUMENTS

| | | |
|---|---|---|
| 5,095,196 A | 3/1992 | Miyata |
| 5,496,991 A | 3/1996 | Delfer et al. |
| 6,023,685 A | 2/2000 | Brett et al. |
| 6,119,096 A | 9/2000 | Mann et al. |
| 6,263,315 B1 | 7/2001 | Talluri |
| 6,374,102 B1 | 4/2002 | Brachman et al. |
| 6,446,917 B2 | 9/2002 | Dieckmann et al. |
| 6,704,713 B1 | 3/2004 | Brett |
| 6,850,901 B1 | 2/2005 | Hunter et al. |
| 6,907,405 B2 | 6/2005 | Brett |
| 6,937,998 B1 | 8/2005 | Swartz et al. |
| 6,952,737 B1 | 10/2005 | Coates et al. |
| 7,162,454 B1 * | 1/2007 | Donner et al. ............ 705/64 |
| 7,171,472 B2 | 1/2007 | O'Brien et al. |
| 7,328,166 B1 | 2/2008 | Geoghegan et al. |
| 7,333,943 B1 | 2/2008 | Charuk et al. |
| 7,475,138 B2 | 1/2009 | Graveline et al. |

(Continued)

FOREIGN PATENT DOCUMENTS

| | | |
|---|---|---|
| EP | 1 054 335 A2 | 11/2000 |
| JP | 53 142300 A | 12/1978 |
| JP | 2001236459 A | 8/2001 |
| WO | WO 00/28485 | 5/2000 |

OTHER PUBLICATIONS

Angwin, Ticketmaster takes on scalpers, eBay with Online Reseller System, Wall Street Journal, Apr. 5, 2002.*
U.S. Appl. No. 10/731,410, filed Dec. 9, 2003, Denker et al.

(Continued)

*Primary Examiner* — Daniel Vetter
(74) *Attorney, Agent, or Firm* — Kilpatrick Townsend & Stockton LLP

(57) ABSTRACT

Systems and methods are described for barcode verification. Optionally, a barcode scanner/imager is coupled to a verification system over a network. The verification system receives over the network barcode data associated with an item, such as a ticket, and associated information. The verification system uses the barcode data and associated information to determine if the barcode is valid and corresponds to an identified event. The verification system transmits a verification result.

42 Claims, 9 Drawing Sheets

(56) References Cited

U.S. PATENT DOCUMENTS

| | | |
|---|---|---|
| 7,574,375 B1 * | 8/2009 | Fraser et al. ............... 705/26.25 |
| 7,584,123 B1 | 9/2009 | Karonis et al. |
| 7,647,269 B2 | 1/2010 | Brett |
| 7,698,210 B2 | 4/2010 | Brett |
| 7,792,700 B2 | 9/2010 | Dubin et al. |
| 7,849,133 B2 | 12/2010 | Denker et al. |
| 7,865,379 B2 | 1/2011 | Sussman et al. |
| RE43,157 E | 2/2012 | Bishop et al. |
| 2001/0018660 A1 | 8/2001 | Sehr |
| 2002/0029296 A1 | 3/2002 | Anuff et al. |
| 2002/0035605 A1 | 3/2002 | McDowell et al. |
| 2002/0042729 A1 | 4/2002 | Yajima et al. |
| 2002/0094090 A1 | 7/2002 | Iino |
| 2002/0095383 A1 | 7/2002 | Mengin et al. |
| 2002/0138771 A1 | 9/2002 | Dutta |
| 2002/0143860 A1 | 10/2002 | Catan |
| 2002/0156715 A1 * | 10/2002 | Wall et al. ................... 705/37 |
| 2002/0178226 A1 | 11/2002 | Anderson et al. |
| 2002/0188523 A1 | 12/2002 | Hyyppa et al. |
| 2002/0194267 A1 | 12/2002 | Flesner et al. |
| 2003/0023500 A1 | 1/2003 | Boies et al. |
| 2003/0024988 A1 | 2/2003 | Stanard |
| 2003/0061147 A1 * | 3/2003 | Fluhr et al. ................... 705/37 |
| 2003/0069827 A1 * | 4/2003 | Gathman et al. ............. 705/37 |
| 2003/0093387 A1 * | 5/2003 | Nakfoor ....................... 705/65 |
| 2003/0120502 A1 | 6/2003 | Robb et al. |
| 2003/0229790 A1 * | 12/2003 | Russell ........................ 705/65 |
| 2004/0006497 A1 | 1/2004 | Nestor et al. |
| 2004/0086257 A1 | 5/2004 | Werberig et al. |
| 2004/0153374 A1 * | 8/2004 | Nelson ......................... 705/26 |
| 2004/0172270 A1 | 9/2004 | Sugimoto et al. |
| 2005/0004818 A1 | 1/2005 | Liman |
| 2005/0015303 A1 * | 1/2005 | Dubin et al. ................. 705/26 |
| 2005/0144115 A1 | 6/2005 | Brett |
| 2005/0209914 A1 | 9/2005 | Nguyen et al. |
| 2006/0082439 A1 | 4/2006 | Bazakos et al. |
| 2006/0095344 A1 | 5/2006 | Nakfoor |
| 2006/0108418 A1 * | 5/2006 | Rice .............................. 235/382 |
| 2006/0140374 A1 | 6/2006 | Light et al. |
| 2007/0027798 A1 | 2/2007 | Brett |
| 2007/0038582 A1 | 2/2007 | Brett |
| 2007/0055439 A1 | 3/2007 | Denker et al. |
| 2007/0055440 A1 | 3/2007 | Denker et al. |
| 2007/0055554 A1 | 3/2007 | Sussman et al. |
| 2007/0061199 A1 | 3/2007 | Montgomery et al. |
| 2007/0124232 A1 | 5/2007 | Brett |
| 2007/0124259 A1 | 5/2007 | Sussman et al. |
| 2007/0136111 A1 | 6/2007 | Sussman et al. |
| 2007/0136112 A1 | 6/2007 | Sussman et al. |
| 2007/0143157 A1 | 6/2007 | Sussman et al. |
| 2007/0143194 A1 | 6/2007 | Fraser et al. |
| 2007/0162301 A1 | 7/2007 | Sussman et al. |
| 2007/0245351 A1 | 10/2007 | Sussman et al. |
| 2007/0276707 A1 * | 11/2007 | Collopy et al. ................ 705/5 |
| 2007/0276944 A1 | 11/2007 | Samovar et al. |
| 2008/0154623 A1 | 6/2008 | Denker et al. |
| 2009/0030744 A1 | 1/2009 | Yamada |
| 2009/0063207 A1 * | 3/2009 | Brodzeller ..................... 705/5 |
| 2009/0063667 A1 | 3/2009 | Smith et al. |
| 2009/0164635 A1 | 6/2009 | Denker et al. |
| 2009/0171821 A1 * | 7/2009 | Denker et al. ................ 705/30 |
| 2009/0177776 A1 | 7/2009 | Denker et al. |
| 2009/0192833 A1 * | 7/2009 | Mersky ......................... 705/5 |
| 2009/0276364 A1 | 11/2009 | Iaia et al. |
| 2010/0088126 A1 | 4/2010 | Iaia et al. |
| 2010/0106653 A1 | 4/2010 | Sandholm et al. |
| 2010/0113072 A1 * | 5/2010 | Gibson et al. ................ 455/466 |
| 2010/0169130 A1 * | 7/2010 | Fineman et al. ................ 705/5 |
| 2011/0218878 A1 | 9/2011 | Dubin et al. |

OTHER PUBLICATIONS

International Search Report, dated Apr. 30, 2010, PCT/US2010/026242.

\* cited by examiner

```
Select an event to jump ahead in the Year  ▼
```

ⓘ Bookmark this page          Events Showing 1-1 of 1  |  Previous  |  Next

Yankees VS. Pirates    Sat January 21, 2010, 8:00 PM          View History

Section STND2    ☐ Seat 1
Row C            ☐ Seat 2
                 ☐ Seat 3
                 ☐ Seat 4

[Sell]  [Transfer & Print]
[Forward]
                                 Learn More Parking Lot    ☐ Pass CAR1-00060
CAR1           ☐ Pass CAR1-00061

[Forward]
                                 Learn More

*FIG.5A*

Horrible Hyenas   Mon January 23, 2010, 8:00 PM          View History

Seat 1 Sold            More Info
Seat 2
Seat 3 Sold $100
Seat 4 On Sale         More Info   Update   Cancel
Seat 5 On Sale         More Info   Update   Cancel
Seat 6

[Forward]  [Sell]  [Print]
                    Learn More

*FIG.5B*

| Home | Help | Contact Us | View Cart | Log Out |

Account Home > Ticket Management

English

[Select an event to jump ahead in the Year ▼]   [All seats ▼]

▶ Bookmark this page        Events Showing 18-28of28  | Previous | Next

Test Event     Wed January 23, 2010, 8:00 PM        View History

Section 115  ☐ Seat 4
Row M        ☐ Seat 5        — add reminder

[Forward]  [Sell]  [Print]

Learn More

Test Event     Mon December 31, 2009, 8:00 PM       View History

Seat 1
Seat 2  Sold: 200.00
Seat 3

[X]
You are now leaving this website and entering an Internet website that is operated by a third party.
Please review the terms of use and other policies appearing on the third party's website

[OK]  [Cancel]

[Forward]  [Sell]  [Print]

Learn More

*FIG. 5C*

NETWORKED BARCODE VERIFICATION SYSTEM

CROSS-REFERENCE TO RELATED APPLICATIONS

This application claims the benefit under 35 U.S.C. §119 of U.S. Provisional Application No. 61/158,237, filed Mar. 6, 2009, the content of which is incorporated herein by reference in its entirety.

STATEMENT REGARDING FEDERALLY SPONSORED R&D

Not applicable

PARTIES OF JOINT RESEARCH AGREEMENT

Not applicable

REFERENCE TO SEQUENCE LISTING, TABLE, OR COMPUTER PROGRAM LISTING

Not applicable

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to barcodes, and in particular to barcode processing and verification.

2. Description of the Related Art

With the advent of the Internet, transactions are often performed over computer networks between two entities that have not conducted previous transactions with each other. Further, the location and even the identity of one entity may be unknown to the other entity. Thus, transactions often carry significant uncertainty and risk. Many conventional transfer systems fail to provide adequate security and authenticity verification for such online transactions.

SUMMARY OF THE INVENTION

Methods and systems for processing and verifying documents are described herein.

Certain example embodiments utilize codes, such as barcodes and related information to verify the authenticity of a document, such as a ticket. For example, optionally the barcode data associated with a ticket may be optically scanned using an imaging device (e.g., a barcode scanner, a camera, etc.) and the digital image of the barcode data is then transmitted to a verification system. The imaging device may be included in a kiosk, turnstile, handheld device, wireless phone, or may be a camera connected to a user computer. The verification system then analyzes the digital image to extract and decode the encoded data. Optionally, instead or in addition, a user manually types in a code corresponding to the barcode. Optionally instead, the code is an identification code that is not associated with a barcode.

In addition, the verification system receives other data related to the document. For example, with respect to a ticket, corresponding event identification may be received. Optionally, seat location information (e.g., section, row, and/or seat number) is also received. The verification system uses to the code and some or all of the additional information to determine whether the document is valid. The verification system can then provide a verification indication to a user and/or a third party system (e.g., associated with a ticket resale service).

An example embodiment comprises a barcode verification system comprising: a barcode interface configured to receive barcode data associated with a ticket barcode associated with a ticketed event, wherein the barcode data was obtained via a barcode imaging device at a first location or was manually entered; an interface configured to receive seating and event data manually provided by a first user offering the ticket and/or by a second user seeking to acquire the ticket; a data store stored that stores: barcode data for issued tickets associated for the ticketed event; event data associated with the issued tickets; seating data associated with the issued tickets; transfer permission data associated with the issued tickets; code stored in memory, that when executed by a computing device is configured to perform verification operations comprising: determine if the received barcode data is in accordance with a first specified format; determine if the received barcode data corresponds to barcode data stored in the data store; when the received barcode data corresponds to barcode data stored in the data store, determine if the received event data corresponds to the event data associated with the issued tickets for the event; determine if the received seating data corresponds to barcode data stored in the data store; determine if the received barcode data is associated with a ticket that is not to be transferred via at least a first transaction type; transmit a positive verification and transfer right indication based at least in part on the determination that: the received barcode data is in accordance with a first specified format; the received barcode data corresponds to barcode data stored in the data store; the received event data corresponds to the event data associated with the issued tickets for the event; and the received seating data corresponds to barcode data stored in the data store.

An example embodiment comprises a method of verifying a barcode, comprising: receiving at a ticket posting system, the ticket posting system including at least one computing device, a ticket posting request by a first user, the ticket posting request including barcode data, event data, and seating data associated with a ticket offer; transmitting a verification request over a network to a verification system, the verification request including the barcode data and the seat data; receiving at the ticket posting system an indication as to whether: the barcode data corresponds to a valid ticket, for an event corresponding to the event data, the ticket is associated with a seat corresponding to the seat data, and is transferable by the first user; if the verification indicates that: the barcode data does not correspond to a valid ticket, or if the verification indicates that: that the barcode data corresponds to a ticket for an event different than that corresponding to the event data, is associated with a seat that does not correspond to the seat data, and/or is not transferable by the first user, inhibiting the posting of the ticket; if the verification indicates that: the barcode data does correspond to a valid ticket, for an event corresponding to the event data, that the ticket is associated with a seat corresponding to the seat data, and is transferable by the first user; enabling the first user to post the ticket for transfer; if, after the ticket is posted for transfer a successful transfer operation is performed with respect to a second user, transmitting a request for a new barcode over the network to a barcode issuing system, the barcode request including an indication that the ticket is being transferred; receiving over the network a new barcode associated by the barcode issuing system with the ticket; enabling the ticket to be provided to the second user with the new barcode.

An example embodiment comprises program code stored in non-transitory, tangible computer readable memory that when executed by a computing device is configured to: receive barcode data associated with a ticket barcode associated with a ticketed event; receive seating and event data manually provided by a first user offering the ticket and/or by a second user seeking to acquire the ticket; store in a data store: barcode data for issued tickets associated for the ticketed event; event data associated with the issued tickets; seating data associated with the issued tickets; transfer permission data associated with the issued tickets; determine if the received barcode data is in accordance with a first specified format; determine if the received barcode data corresponds to barcode data stored in the data store; when the received barcode data corresponds to barcode data stored in the data store, determine if the received event data corresponds to the event data associated with the issued tickets for the event; determine if the received seating data corresponds to barcode data stored in the data store; determine if the received barcode data is associated with a ticket that is not to be transferred via at least a first transaction type; transmit a positive verification and transfer right indication based at least in part on the determination that: the received barcode data is in accordance with a first specified format; the received barcode data corresponds to barcode data stored in the data store; the received event data corresponds to the event data associated with the issued tickets for the event; and the received seating data corresponds to barcode data stored in the data store.

An example embodiment provides a verification system comprising: an interface configured to receive coded data associated with a ticket for a ticketed event; a data store stored that stores: coded data for issued tickets associated for the ticketed event; event data associated with the issued tickets; seating data associated with the issued tickets; code stored in non-transitory memory, that when executed by a computing device is configured to: determine if the received coded data is in accordance with a first specified format; determine if the received coded data corresponds to coded data stored in the data store; determine if event data received in association with the coded data corresponds to the event data associated with the issued tickets for the event; transmit a positive verification based at least in part on the determination that: the received coded data is in accordance with a first specified format; the received coded data corresponds to coded data stored in the data store; and the received event data corresponds to the event data associated with the issued tickets for the event.

An example embodiment provides a method of verifying a ticket, comprising: receiving coded data associated with a ticket for a ticketed event; determining, using a computing device, if the received coded data is in accordance with a first specified format; determining, via the computing device, if the received coded data corresponds to coded data stored in a data store; determining, via the computing device, if event data received in association with the coded data corresponds to event data associated with an issued ticket for the event; and transmitting, via the computing device, a positive verification based at least in part on the determination that: the received coded data is in accordance with a first specified format; the received coded data corresponds to coded data stored in the data store; and the received event data corresponds to the event data associated with the issued ticket for the event.

An example embodiment provides a method of verifying a ticket, comprising: receiving coded data associated with a ticket for a ticketed event; optionally determining, using a computing device, if the received coded data is in accordance with a first specified format; optionally determining, via the computing device, if the received coded data corresponds to coded data stored in a data store; optionally determining, via the computing device, if event data received in association with the coded data corresponds to event data associated with an issued ticket for the event; optionally determining, via the computing device, if the received coded data is associated with a ticket that is not to be transferred via at least a first transaction type; and transmitting, via the computing device, a positive verification based at least in part on the determination that: the received coded data is in accordance with a first specified format; the received coded data corresponds to coded data stored in the data store; and/or the received event data corresponds to the event data associated with the issued ticket for the event.

BRIEF DESCRIPTION OF THE DRAWINGS

Embodiments will now be described with reference to the drawings summarized below. These drawings and the associated description are provided to illustrate example embodiments, and not to limit the scope of the invention.

FIGS. 5A-C illustrate example user interfaces.

DETAILED DESCRIPTION OF PREFERRED EMBODIMENTS

Figure 1:
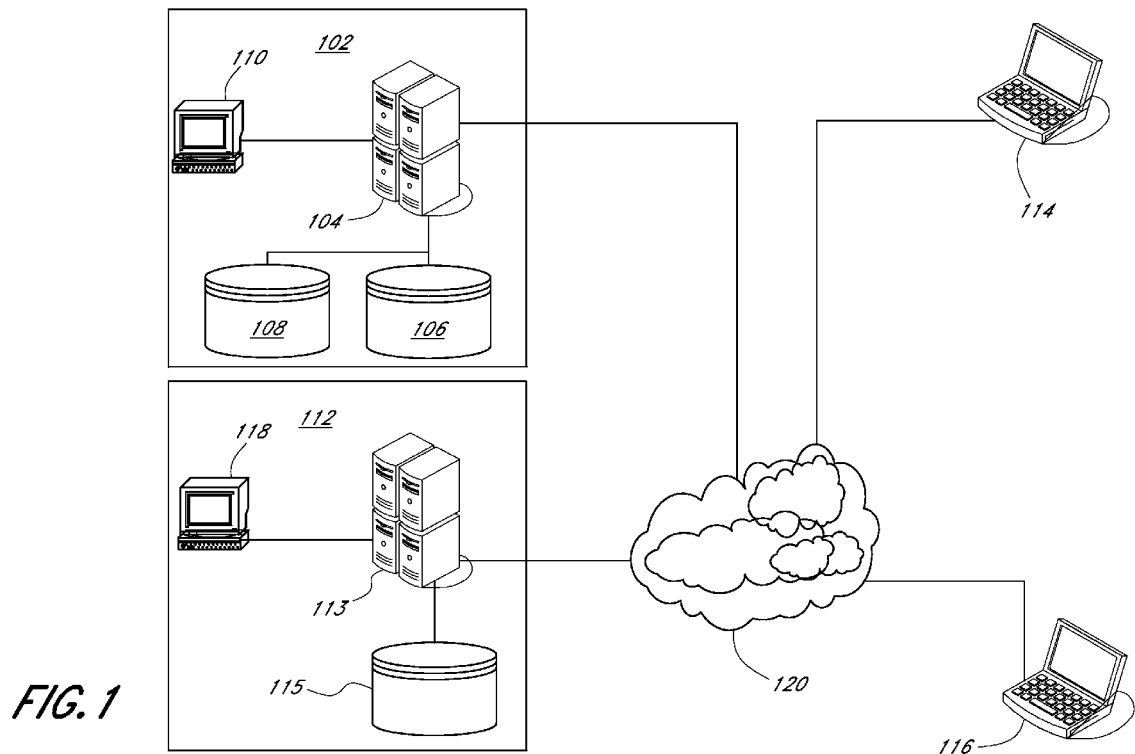
FIG. 1 illustrates an example system embodiment that can be used in conjunction with processes described herein.

Described herein are systems and methods for performing authentication of documents or instruments. For example, certain embodiments may be utilized to verify that a ticket (e.g., a voucher to indicate that one has paid for or is entitled to admission to a theatre, sporting event, concert, lecture, amusement park, zoo, aquarium, museum, or other attraction/event, or entitled to travel on an airplane, public transit, train, or other mode of transportation, and may indicate that the holder is entitled to use a specific seat) is authentic. Certain embodiments provide barcode verification for tickets being transferred, even when the tickets are being transferred (e.g., as part of a resale process) by a system other than the original ticket issuer system.

Transactions involving tickets, and in particular event tickets, have greatly increased with the advent of online ticket transactions. This increase has been particularly notable with respect to resale transactions. For example, many season ticket holders for sporting events are often unable to attend one or more games during the corresponding season. Thus, rather than simply allow their seats to remain empty, a season ticket holder may seek to transfer (e.g., via a resale) one or more game tickets to another party. The resale may be conducted via a service offered by the original ticket issuer, or via the performer or promoter. By way of further example, the resale may be provided via a third party service, such as an auction site, a ticket broker that resells tickets on behalf of itself and/or other parties, or an online classified advertisement site.

Because many of these transactions involve buyers and sellers that do not know one another, and where the buyer may be unaware of the seller's name, address, or other important information, a great deal of risk is present in many such transactions. All too often, buyers learn to their dismay that the ticket they purchased in what was purported to be a resale, turns out to be a counterfeit. In certain instances, such as when the ticket is purchased through certain brokers, the broker may refund the purchaser money. In other instances, no refund may be forthcoming. However, even in instance where the purchaser obtains a refund after being denied entry at the ticketed event, the purchaser still misses the event, and already went to the trouble and expense of driving to the event, paying for parking, babysitters, and/or other generally non-reimbursed expense. Thus, such refunds are generally unsatisfactory.

Further, many ticket resale services are limited in how they can deliver tickets. For example, most conventional resale services simply provide for the mailing or hand delivery of the original tickets to the new buyer, which is time consuming and relatively expensive. Thus, for example, most ticket resale services do not provide for pickup of a ticket via a will call ticket office or via download from a website.

In addition, conventionally, because disparate databases of different systems (such as that of an initial ticket seller system and that of a reseller ticket system), controlled by different entities, may include different portions of the sale history of a ticket, the various systems lack a mechanism to verify that a given ticket being resold, is authentic.

In order to overcome some or all of the foregoing deficiencies and technical challenges, an example embodiment enables a purchaser to receive verification that a ticket is indeed genuine, even when the ticket is being purchased as a resold ticket. By way of example, when a purchaser has initiated a transaction with the seller (e.g., a user that had previously purchased a ticket (a single ticket or a season ticket)), the seller may automatically, or in response to a seller and/or buyer action, be asked to provide ticket identification information to a trusted verification system. Optionally, the verification system may be included in a ticket system that originally issued tickets being resold.

Optionally, the seller may be requested by a posting system to provide such ticket identification information for analysis by a trusted verification system even before the seller's tickets are accepted for posting.

The term "ticket", as used herein, can encompass electronic tickets or physical tickets. Further, the tickets can be delivered electronically or physically. For example, a ticket can be in the form of a printed ticket, a code, an electronic token, an association with an existing identifier, a membership card, or otherwise. A ticket can be delivered wirelessly, downloaded to a computer terminal for printing by the recipient, emailed to a recipient, or otherwise delivered.

One or more of the systems described herein is configured to receive and/or process identification/authentication information received from an identification/authentication input device, such as input device (e.g., a barcode scanner, a character reader, a smart card reader, an RFID reader, a biometric reader (e.g., a fingerprint, palm print, iris scanner, etc.), a keypad (e.g., a physical or touch ASCII or sub-ASCII keyboard for receiving a ticket identifier, user identifier, ticket holder identifier, etc.), etc). The received data may then be authenticated as described herein.

For example, optionally, the user keys in a code corresponding to a ticket barcode (e.g., printed adjacent to the barcode and corresponding to data encoded in the barcode) via a keyboard (e.g., a user terminal keyboard). Optionally in addition or instead, an input device (e.g., a barcode reader, camera, etc.) optionally scans tickets (which can be a physical ticket or an electronic ticket, such as one stored in a mobile phone and displayed by a mobile phone display, or a smart card bearing a ticket token) or otherwise receives ticket information (ticket codes, ticket holder codes, and/or ticket purchaser codes) from a user or a ticket-bearing device. The term "scan" as used herein is intended to encompass photographs.

By way of example, ticket information is provided via a barcode that optionally includes start and stop markers, a checksum, and/or quiet zones, in addition to the encoded message. Optionally, one or more of the following barcode formats may be used: Code 39, Extended Code 39, Code 128, UCC/EAN-128, Industrial 2 of 5 Planet, Interleaved 2 of 5, Codabar, UPC-A, UPC-E, EAN 13, EAN 8, BOOKLAND, MSI, Code 11, Code 93, PDF417, POSTNET, PLANET. Other formats, including proprietary formats, may be used as well.

The input device optionally is also configured to read one or more types of identification devices (e.g., by optically, magnetically, electronically, and/or wirelessly reading data embodiment on a credit card, student ID, membership card, driver license magnetic stripe, smart card, passport tags, etc.). For example, the input device optionally reads magnetic stripes, machine readable characters, RFID tags, data stored in computer readable memory, etc. The input device optionally includes a biometric scanner configured to read one or more physical attributes of a ticket holder (e.g., fingerprint, palm, veins, retina, iris, voice, face, body, etc.).

For example, the seller may be asked to take a picture or scan of a barcode (e.g., a one dimensional or two dimension barcode) on the ticket being sold (e.g., via a web camera connected to a user terminal associated with the seller, via a picture taken with a standalone camera or cell phone camera, via an LED-based barcode scanner, or otherwise), and upload the barcode image or scan to the verification system or to the system via which the ticket is to be posted for resell (e.g., an auction system, a fixed price system, or a system that supports both auction and fixed price sales). Optionally, the seller and/or the buyer may be asked to provide a locator (e.g., a URL (Uniform Resource Locator), path name, etc.) corresponding to the seller posting. Optionally, instead or in addition, the system hosting the seller posting may automatically (or in response to a seller and/or buyer action) pass the URL and/or other posting information to the verification system. For example, some or all of the following information may be passed to the verification system: name of the event, date of the event, time of the event, city/town/county/state of the event, event venue, etc.

The verification system optionally uses the posting locator to access information regarding tags/field names used by the system hosting the posting. For example, the verification system can use the locator address to access from a verification database the data associated with tags/field names used by the posting service associated with the posting locator address. By way of illustration, an example posting service may have the following fields/tags (although fewer, additional, or different fields/tags may be used and/or different field/tag names may be used):

EventName
EventDate
EventTime
EventCity
EventState
EventVenue
TicketQuantity
SeatIdentifier$_{1\ (seat\ identifier\ for\ first\ seat\ associated\ with\ ticket(s))}$ SeatIentifier$_{n}$ $_{(seat\ identifier\ for\ n^{th}\ seat\ associated\ with\ ticket(s))}$
AskingPrice By way of further example, another posting service hosted by a posting system may include the following fields/tags:

PerformerName
Date
Time
Venue
City
Venue
SeatLocation(s)
Price

The verification system can use the tag/field information to identify corresponding information in the seller posting (e.g., some or all of the following: name of the event, date of the event, time of the event, city/town/county/state of the event, event venue, etc.). This information can then be used in the verification process, as discussed in greater detail herein.

Optionally, the posting information may also or instead be provided by the seller and/or buyer, or pushed to the verification system by the posting system. Optionally, the asking ticket price is not transferred (e.g., inhibited from being transferred) from the posting system to the verification system. Optionally, a final sales price is transferred from the posting system to the verification system (e.g., once the sale is complete).

Optionally, the verification system analyzes the barcode data to determine if it corresponds to a valid barcode. The barcode may correspond to a unique ticket code assigned by the original ticket issuer and stored in a ticket database for later reference. For example, a valid barcode may need to comply with a certain format. The verification can examine the barcode data to determine whether it complies with a specified format.

If verification system determines the barcode format of the ticket offered for sale is not valid, optionally, the seller is offered another opportunity to upload the barcode (e.g., in case the seller inadvertently uploaded the barcode for a ticket different than the one that is the subject of the purchase transaction, or in case the upload image is of poor quality) and/or otherwise provide the ticket barcode (e.g., by manually entering corresponding barcode data printed on the ticket using a keyboard). Optionally instead, after the seller has failed to provide a properly formatted barcode after a certain number of attempts (e.g., a maximum threshold number of attempts specified by an operator and stored in the verification systems memory), a notification is sent to the purchaser (and optionally the seller) indicating that the verification process has failed. At this point the purchaser (and optionally the seller) is provided the option to terminate the sale process, or the sale process may be automatically terminated by the verification system and/or by the posting system.

If the verification system determines that the barcode format is a valid format (assuming the optional format check is performed), the verification system then accesses a ticket database that stores barcode data corresponding to barcodes on issued, valid tickets. The database may optionally be associated with the original ticket issuer (e.g., a ticket system of which the verification system is a part) or may associated with another entity that stores information on valid ticket barcodes. The seller provided barcode data may be compared against barcode data for valid tickets accessed from the database. If the seller-provided barcode data matches that of a valid barcode in the database, then related ticket information is accessed from the ticket database or other source. By way of illustration, the related ticket information may include seating and/or event information.

For example, the ticket information may include some or all of the following data and/or other data: event identifier code (event ID), name of the event, date of the event, time of the event, city/town/county/state of the event, event venue, seat identifier (e.g., seating section, seating row, seat number/letter, or if general admission, a general admission designation, optionally including a general admission section area, such as floor or balcony), identification of the current registered ticket holder, etc. The verification system then compares some or all of the ticket information with the posting information, and if there is a match, the buyer and/or seller are optionally provided with an indication that the verification process has determined that the ticket is authenticate.

In order for there to be a "match", different thresholds may optionally be set (e.g., by an operator) in the verification system memory. For example, all information may be required to match, a subset of information may be required to match, or a certain percentage or minimum amount of information may be required to match. By way of example and not limitation, the matching threshold may be set to 3 out of 5 types of information must match. By way of further example and not limitation, the matching criteria may specify that certain information is required to match, such as the seat identifier, event name, date, and city, and 2 out of 3 pieces of other information must match, such as, by way of example, 2 out of 3 of the following: registered ticket holder name, venue name, time of the event.

If the verification process fails (e.g., because the posting information does not "match" the ticket information), the purchaser (and optionally the seller) is so informed. At this point the purchaser (and optionally the seller) is provided the option to terminate the sale process, or the sale process may be automatically terminated by the verification system and/or by the posting system.

Optionally, rather than or in addition to comparing information from the ticket database with the seller posting information, the verification system accesses the ticket information from the ticket database and transmits it for display to the buyer (and optionally the seller). The buyer can then verify that the ticket information corresponds to the ticket that the buyer wants to purchase.

Status changes related to a ticket can be stored in databases associated with one or more systems (e.g., the ticket system, the posting system, and/or the verification system). For example, when a ticket is offered for resale, a corresponding status notation is stored. If a potential buyer has initiated a purchase of the ticket, a reserved status notation is stored. Similarly, when a ticket resale has been performed, a corresponding status notation is stored, optionally in association with the sales price. Optionally, an indication is stored when the ticket is resold by someone who does not have an account with one or more specified systems (e.g., the ticket system, the posting system, and/or the verification system).

If an event is cancelled, in an example embodiment, the transaction record (of the resale of the ticket to the buyer) is used to determine who is to receive the refund (if any). For example, when an event cancellation notification is received at the appropriate system (e.g., the posting system and/or the verification system), the system accesses the ticketing database to determine who is currently recorded as owning tickets for the event. For example, if a resale has occurred, as described above, the system will have a record of the new purchaser as owning the corresponding ticket. Therefore, the system will process a refund to the new purchaser. Optionally, the purchaser of the ticket receives a cancellation refund from the third party from which the purchaser purchased the ticket. Optionally, the seller who first purchased the ticket via the ticketing system would be provided a refund via the ticketing system operator that made the first sale of the ticket.

FIG. 1 illustrates an example architecture that can be utilized with certain embodiments. A ticket system 102 includes one or more servers 104. The servers 104 may be separate computers or may be operating concurrently on the same computer. The ticket system 102 can include account manager servers, a verification system, a credit card authorization system, an internal network, request routers, data and status queues, and an interface to one or more networks 120, optionally including the Internet. The ticket system 102 can host a Web site accessible by users for searching for, purchasing, transferring, and selling tickets. The ticket system 102 can include one or more databases whose data can be accessed as needed. For example, the databases can include a user account database 106, that stores user contact information, billing information, preferences, account status, ticket inventory currently held and historically held by the user (and the associated ticket statuses), settlement information, and the like, that can be accessed by the ticket computer system, such as by account manager servers.

The ticket system 102 optionally includes a database 108 that stores rules indicating which ticket may be posted for resale, barcode data for event tickets, the status of tickets (such as described below), event data (e.g., event identifier, performer/sports team name, event venue, event date, event time, whether the event has been cancelled, whether the event has been rescheduled, etc.), venue data (e.g., seating charts and information, such as section/row/seat number data), and so on.

By way of example, a ticket status indicator may optionally indicate whether the ticket is locked, unlocked, transferred, posted, resold, reserved, complementary, not permitted to be resold, etc.

The rules may optionally indicate whether some or all of the following statuses should prevent/inhibit a ticket from being resold (e.g., in response to ticket posting request, optionally including barcode data associated with a ticket posting request): barcode will not decode, event id mismatch, event expired, event is inaccessible, wrong barcode mode, series seat, seat type mismatch, reissued ticket, tickets are for non-adjacent seats, account not balanced, lock failed, tickets are already locked, tickets are reserved (indicating that another user is already in the purchase process for the tickets), event cancelled, tickets already posted, event date has past or insufficient time before event to process ticket transfer/resale, event is not bar-coded/barcode is invalid, tickets are not fully paid for, tickets are complimentary tickets that may not be resold, ticket holder is restricted from reselling tickets, tickets have already been transferred, tickets have already been resold, tickets have added credit assigned, tickets have been transferred to a card, barcode does not belong to the event provided in the request, barcode is invalid/no longer active as a result of a resale process or other process.

An API (application programming interface) may be associated with the ticket system via which third party systems, such as a third party ticket resale system 112, may communicate with the ticket system. For example, the API may define routines, data structures, object classes and/or protocols to be used in communicating with the ticket system 102 (and the associated verification system).

The ticket resale system 112 likewise includes one or more servers 113. The servers 113 may be separate computers or may be operating concurrently on the same computer. The resale system 112 can include account manager servers, a credit card authorization system, an internal network, request routers, data and status queues, and an interface to one or more networks 120, optionally including the Internet. The resale system 112 can host a Web site accessible by users, for searching for, purchasing, transferring, and selling tickets. The resale system 112 can include one or more databases whose data can be accessed as needed. For example, the databases can include a user account database 115 which stores user contact information, billing information, preferences, account status, ticket inventory currently held and historically held by the user (and the associated ticket statuses), settlement information, and/or other information.

Buyers and sellers may access the ticket system 102 and/or the resale system 112 via corresponding user terminals 114, 116.

As will now be described with reference to the figures, in an example process, a seller (e.g., of a holder of a single event ticket or a season ticket holder) posts a ticket for sale on a posting site (e.g., associated with the original ticket issuer, performer, promoter, a third party auction and/or fixed price hosting site). Optionally, the seller can edit the posting (e.g., change the item description, price, or other information) and/or cancel the posting via the posting site or other interface.

Figure 2A:
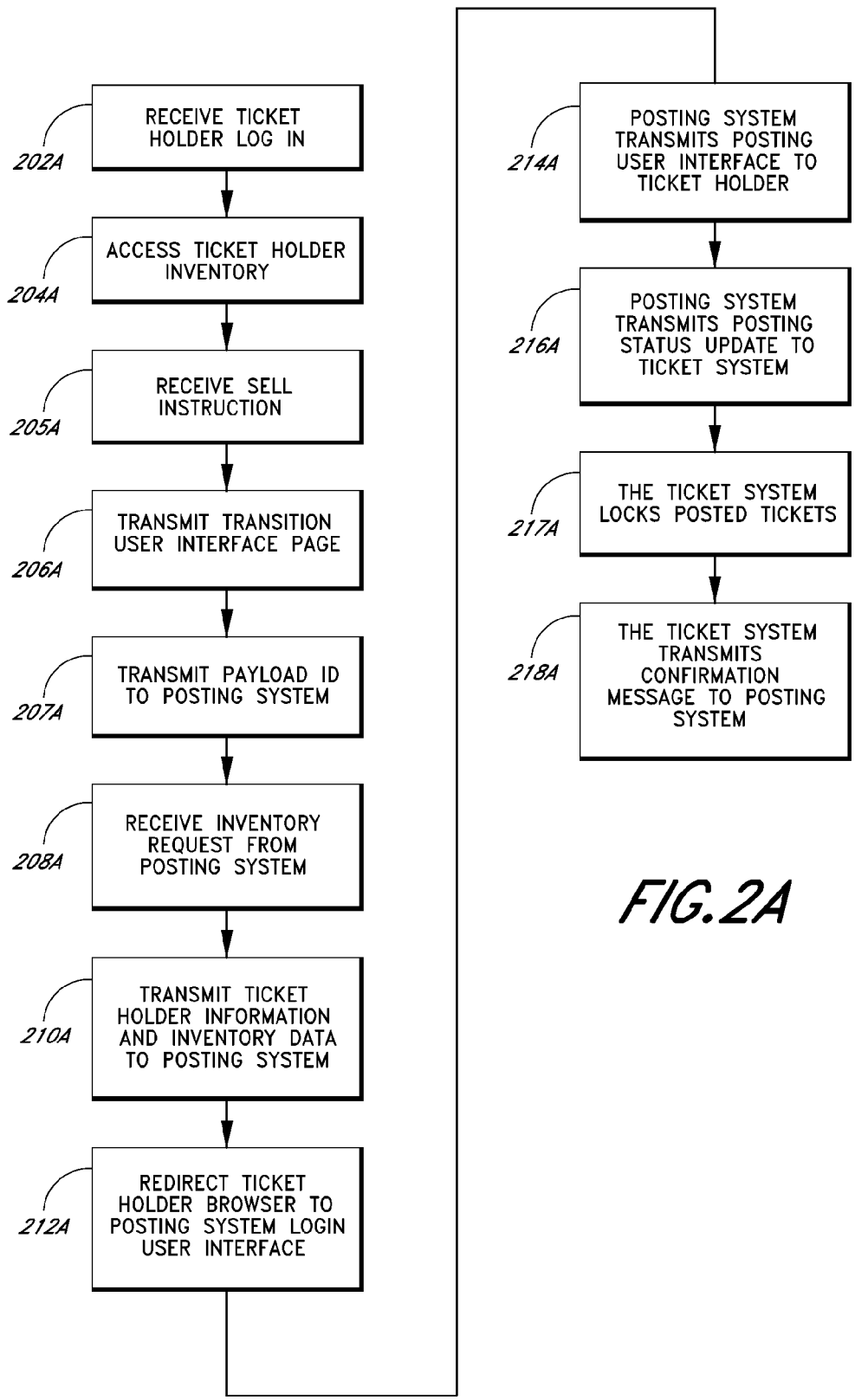
FIGS. 2A-D illustrate example document posting and verification processes.

Referring now to FIG. 2A, at state 202A, the ticket holder/user logs onto the ticket system, and accesses the ticket holder's ticketing account (e.g., hosted by a ticket system or by a system that has access to the ticket holder's account). The account may store a record of tickets owned by the ticket holder. At state 204A, the system uses the ticket holder identification information (e.g., login information) to access from the ticket system ticketing database information regarding the tickets currently owned/controlled by the ticket holder.

The accessed information is provided to a terminal for display to the ticket holder, including a listing of some or all of the tickets owned/controlled by the ticket holder. The ticket holder selects one or more tickets that the ticket holder wants to sell (e.g., by clicking on a sell control/field displayed alongside a given ticket listing). Optionally, the listing includes an indication (e.g., via text or the absence of an associated sell control) as to whether there is a prohibition or restriction on the ticket holder reselling a given listed ticket. Optionally, the ticket holder is prevented from selecting such a ticket for resale. For example, the ticket system database may indicate that certain event tickets may not be resold because of the ticket type (e.g., the tickets were provided as complimentary tickets by the performer or as part of a event promotion), or the ticket holder status (e.g., the ticket holder has a past due account balance, or has resold more than a threshold number of tickets in a specified period of time).

Optionally, in addition to the event tickets, information regarding related items/events is also displayed via the ticket holder terminal. For example, prepaid/free parking and/or prepaid/free concessions may be listed. Optionally, the ticket holder may only be allowed to resell a related item/event if the primary admission ticket for the event is being sold with the related event/item. The ticket system will thus inhibit the resale of a related item separate from the associated event ticket.

At state 205A, the ticket system receives a ticket holder selection of a sell option (e.g., provide by the ticket holder by activation of a sell control).

At state 206A, the ticket system optionally directs the ticket holder browser to a transition user interface informing the ticket holder that a transition to another operator's website is taking place.

At state 207A, the ticket system transmits a payload ID (e.g., over a network) directly or indirectly to the ticket posting site (e.g., that of the ticket issuer, performer, a third party, etc.). The payload ID can be used to identify the session and ticket information used during the posting request. At state 208A, the posting site uses the payload ID to make a request over the network to the ticket system for seller information and/or ticket inventory information. The payload ID is optionally used as a token to authenticate the request and to lookup customer account information (that of the ticket holder in this example), including customer ticket inventory information.

At state 210A, the seller information and ticket inventory information are returned by the ticket system to the posting system. For example, some or all of the following information is provided: an event code (e.g., an event ID identifying the event), event information (e.g., event name, event time, event city/state, venue name), ticket seating information (e.g., section/row/seat), a ticket identifier (e.g., encrypted barcode information for subsequent requests), and seller account information which can be mapped to the posting system/ticket holder's account. The seller account information advantageously enables future redirects to be performed in a streamlined manner for the customer. The seller account information can include some or all of the following (and/or other data):

Account ID (identifier) associated with the ticket holder's posting system account Account ID (identifier) associated with the ticket holder's ticket system account
   First Name
   Last Name
   Middle Name
   Title
   Prefix
   Suffix
   Address
   City
   State
   ZIP Code
   E-mail Address
   Home Phone
   Work Phone
   Mobile Phone The posting system stores the returned information in posting system memory.

At state 212A, the ticket holder is redirected from the ticket system to a log-in user interface (e.g., provided via a Webpage) associated with the posting system. If the ticket holder has an account with the posting system, then optionally the ticket holder is automatically logged in (e.g., where the ticket holder browser has the login password and user ID and can populate the login field). Optionally the user is automatically logged in without presenting a log-in user interface. Optionally, the ticket holder manually logs in to the posting system via the log-in user interface by entering a user identifier and/or password. If the ticket holder does not have an account with the posting system, optionally the posting systems asks the ticket holder to establish an account.

At state 214A, the posting system provides a user interface for display to the ticket holder. By way of example and not limitation, the seller may be asked to provide some or all of the following information and/or other information:
   first name, last name, address, e-mail address;
   event code;
   ticket category (e.g., sporting event, concert event, theater, movie, etc.);
      if the ticket is for a sporting event: the type of sport (e.g., baseball, football, basketball, etc.); the league, if any (Major League Baseball, National Football League, National Basketball Association, etc.); an indication as to whether the tickets are for a regular search game, a training game, a playoff game, an exhibition game, etc.; the team name; the specific game (e.g., identified by data, time, location);
      if the ticket is for a concert, the performer name, the data, time, venue, etc.
   seating information, such as seat section, seat identifier (e.g., row, seat number);
   ticket barcode data;
   number of tickets The information provided by the ticket holder is stored in the posting system memory.

At state 216A, the posting system transmits a message to the ticket system indicating that the selected ticket is being or is about to be posted. The ticket system puts at least a temporary lock on the ticket to prevent or inhibit the ticket holder from transferring the ticket via the ticket system except as instructed/permitted by the posting system. For example, if the ticket holder has notified that posting system that the ticket holder's ticket is no longer to be offered via the posting system (and the ticket has not yet been resold), the posting system sends an "unlock" message to the ticket system so that the ticket holder can transfer or sell the ticket via another channel.

At state 217A, the ticket system may perform a lock or unlock operation using the ticket ID and/or the ticket barcode to access the corresponding ticket record. At state 218A, the posting system transmits a confirmation status message to the ticket system and/or other designated recipient. Optionally, the message includes an indication as to whether the ticket holder is allowed to edit or cancel the posting.

In the foregoing example, the ticket holder optionally does not need to post or enter the ticket barcode as the ticket system has records of what tickets are owned/controlled by the ticket system and the ticket system has authenticated that the ticket holder is providing the posting instructions (e.g., via the log in information).

Figure 2B:
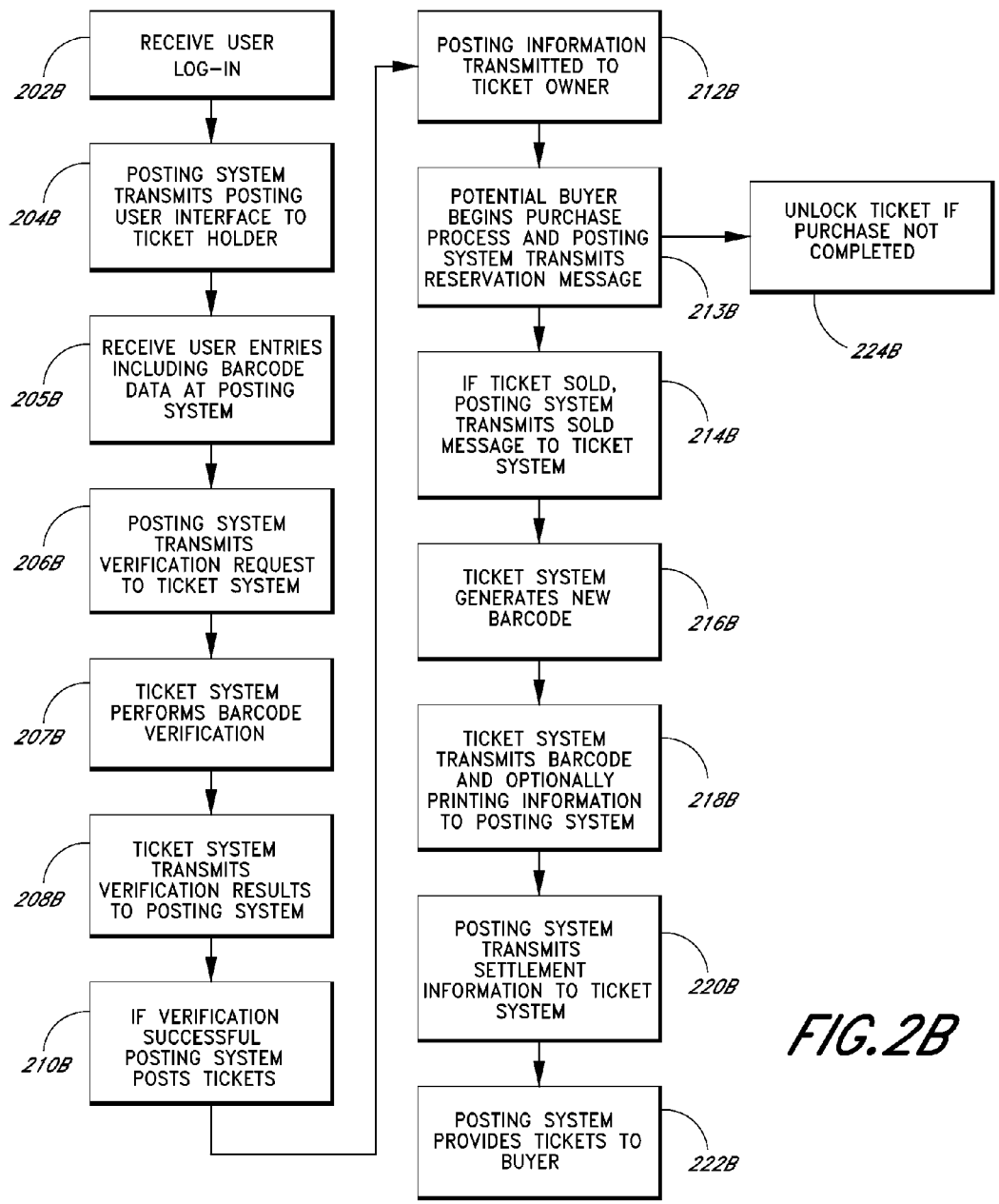

Optionally, rather than first accessing the ticket system website and then being redirected to the posting website, the ticket holder may navigate directly to the posting website in order to resell a ticket. In this example, the ticket holder provides the posting system with barcode data (e.g., by entering text characters corresponding to the barcode and/or an image of the barcode) so as to verify that the ticket holder is the holder of the tickets being posted. With reference to FIG. 2B, at state 202B, the ticket holder logs into the posting system website in order to post the holder's ticket(s). At state 204B, the posting system presents a form to the ticket holder, as similarly discussed above. Optionally, the system is configured to receive bulk uploads of barcodes, which are then automatically validated and posted. This is particularly beneficial for entities, such as ticket brokers, that control large numbers of tickets.

The form may include some or all of the following fields: first name, last name, address, e-mail address, event code, ticket seating information, ticket identifier, barcode data. Certain of the fields may be prepopulated from data previously provided by the ticket holder (e.g., first name, last name, address, e-mail address, event code, event information, ticket seating information, ticket identifier). Other information, such as asking price, may be manually entered into the form. The ticket holder enters the barcode information associated with the ticket holder. For example, the ticket holder can type in or otherwise enter the code corresponding to the ticket barcode (e.g., which the ticket holder ticket has a code printed underneath the barcode).

In certain embodiments the form requests the ticket holder to provide a visual image of the barcode. By way of illustration, the ticket holder can use a camera (e.g., a stand alone camera, a web cam, a cell phone camera, or other camera) to take a picture of the barcode and then upload the barcode picture by using the form provided by the ticket posting system (e.g., using a browse control that enables the ticket holder to browse the ticket holder's terminal or other system). The ticket holder may directly email the ticket to the posting system (which can then extract or scan the ticket barcode), or may electronically copy and paste the barcode (e.g., where the ticket was emailed to the ticket holder or was downloaded from a website) into a form (e.g., provided by the ticket posting system). In some instances, a ticket may be distributed with a scannable barcode in conjunction with an equivalent alphanumeric code. In such instances, optionally the form provided to the ticket holder includes a field via which the user can enter the alphanumeric code instead of or in addition to an image of the ticket barcode.

Optionally, the ticket holder enters the ticket price at this state. Optionally instead, the ticket holder is inhibited from entering the ticket price until the barcode verification procedure is performed. At state 205B, the posting system receives the data, including the barcode data/corresponding code, and the data is stored in memory.

At state 206B, the posting system transmits a verification request to the ticket system. The verification request includes bar code information and optionally some or all of the related information provided by the ticket holder. Optionally, the verification request may also include some or all of the following: an event identifier (previously assigned via the ticket system), a ticket identifier assigned by the posting system (which optionally is the ticket barcode), and a classification (e.g., indicating with the ticket is a standard ticket or associated with event parking).

At state 207B, the barcode is validated (e.g., using techniques described herein) by the ticket system in response to the posting system verification request. For example, the barcode data provided by the ticket holder optionally has its format checked. If the format (e.g., the number and type of characters) is valid, the barcode is compared to those in the ticket system database to determine if there is a match. If there is a match, the event data provided by the ticket holder is compared with that associated with the matching barcode. If they correspond, the system indicates the ticket has been successfully verified.

In addition, optionally a determination is made (e.g., by accessing the ticket system database) as to whether the ticket is or is not eligible for resale. For example, the original ticket issuer may have originally sold the ticket with a restriction preventing resale. By way of further example, there may be governmental restrictions on a ticket resale. By checking on whether a resale is permitted or not, the posting system can honor any such restrictions. Optionally, the verification system will check if a single posting includes tickets for non-adjacent seats, and if so, indicates in the response that the tickets for non-adjacent need to be separately posted.

At state 208B, a response to the verification request is transmitted from the ticket system to the posting system. The response may include some or all of the following data:
ticket identifier assigned by the ticket system;
ticket identifier assigned by the posting system (which may be the ticket barcode information);
ticket status (indicating whether the ticket is eligible for posting);
seating section (optionally with a null value if the ticket is a general admission ticket without an assigned seat);
row (optionally with a null value if the ticket is a general admission ticket without an assigned seat);
seat (optionally with a null value if the ticket is a general admission ticket without an assigned seat);
an indication as to whether the ticket is a general admission ticket without an assigned seat;
classification (e.g., indicating with the ticket is a standard ticket or associated with event parking);
price level;
ticket type;
face value;
tax on the seat tickets.

Optionally, the ticket status can include a code and/or human readable text indicating some or all of the following conditions, when present:
barcode will not decode;
event id mismatch;
expired event;
event is inaccessible;
wrong barcode mode;
series seat;
general admission ticket;
scanned seat;
seat type mismatch;
reissued ticket;
tickets are for non-adjacent seats;
account not balanced;
account not printed;
lock failed;
seats are locked;
tickets are reserved (indicating that another user is already in the purchase process for the tickets);
cancelled event;
tickets already posted;
event date has past or insufficient time before event to process ticket transfer/resale;
event is not bar-coded/barcode is invalid;
tickets are not fully paid for;
tickets are complimentary tickets that may not be resold;
ticket holder is restricted from reselling tickets;
tickets have already been transferred (without the ticket system collecting payment from the recipient);
tickets have been resold;
tickets have added credit assigned;
tickets have been transferred to a card;
barcode does not belong to the event provided in the request;
barcode is invalid/no longer active as a result of a resale process or other process.

Some or all of the foregoing statuses may indicate to the posting system that the tickets are not to be posted for resale.

At state 210B, if the ticket barcode is validated and a determination is made that the ticket can be resold, the ticket is posted for resale on the posting system website (or a related site) so that users can view the posting and decide whether to purchase the ticket. Optionally, a confirmation is transmitted back to the ticket system (optionally including a Ticket ID as a reference), which will store an indication as to which tickets are posted for resale and via which posting system service. When the ticket holder next visits the ticket system website and accesses the ticket holder's ticket listing, the ticket system will display an indication to the ticket holder which tickets have already been posted for resale and via which posting service/system.

If the barcode was not validated by the ticket system and/or a determination made that the ticket cannot be resold, a notification is provided to the ticket holder reporting the foregoing.

Optionally, at state 212B, the ticket system and/or the posting system transmits a posting confirmation message to the ticket holder (e.g., via a Webpage, email, SMS message, MMS message, instant message, or otherwise, optionally using an address provided by the ticket holder in the ticket holder's account setup or when the ticket holder purchased the ticket). For example, the ticket system can transmit the confirmation message to the email address registered with the ticket system at the time of the original ticket purchase or earlier. Then, if the real ticket holder did not post the ticket for resale (e.g., where a user is attempting to fraudulently sell a ticket the user does not own), the ticket holder can activate a link included in the email or otherwise contact the ticket system and/or posting system to cancel the improper posting. The ticket system will store the cancellation command and prevent a sale based on the improper posting.

At state 213B, if a potential buyer begins a purchase process with respect to the posted ticket(s) (e.g., places the ticket(s) in an online shopping cart), the posting system optionally transmits a reservation notification to the ticket system identifying the tickets (e.g., using the barcodes and/or ticket IDs), an event identifier (e.g., previously assigned via the ticket system), and a reservation time. The ticket system will then place a reservation lock on the corresponding tickets for the reservation time (which optionally may be different than the requested reservation time), pending the sale or abandonment of the purchase. The ticket system optionally transmits a reservation confirmation message to the posting system.

If the ticket is sold via the posting system, the posting system optionally transmits a sold notification to the ticket system at state 214B. The sold notification can include a sold indication, a corresponding Ticket ID, and optionally the name/identifier of the purchaser. The ticket system can store some or all of the notification information in the ticket system database. Thus, the ticket system is aware that the original purchaser no longer owns the ticket and optionally is aware of the identity of the new owner, who can then similarly resell the ticket.

Optionally, still additional information can be transmitted from the posting system to the ticket system. For example, the sold notification can include some or all of the following information:
  a sold attribute;
  a ticket delivery method (e.g., indicating that the ticket system is to fulfill the request using a specified method, such as via a print at home ticket downloaded or emailed to the buyer, via a will call ticket office, via a transmission to the buyer phone, etc.);
  an indication that a will call ticket delivery method is to be used because of a potential fraud risk;
  an order identifier (e.g., generated by the posting system);
  buyer billing contact information;
  seller contact information;
  settlement information (such as discussed elsewhere herein);
  ticket request objected to be "exchanged" for new barcodes;
  barcodes to be "exchanged" for new barcodes;
  an event identifier.

At state 216B, optionally the ticket system generates a new barcode to be used on the sold ticket (where the buyer will be issued a ticket with the same seating rights as the original ticket, but with a different barcode). If there are multiple tickets, multiple new barcodes may be generated. In addition, the ticket system optionally cancels the old barcodes, and stores a corresponding cancellation status indication in association with the cancelled barcodes. This will prevent someone from attempting to sell tickets using the cancelled barcodes or from attempting to enter the event using the cancelled barcodes. The new barcodes are stored in the ticket system database as active ticket barcodes. Optionally instead, the original barcode may be used.

At state 218B, the one or more new barcodes are optionally transmitted to the posting system with printing instructions (e.g., so that the posting system can provide tickets with the new barcodes to the buyer). For example, a message including some or all of the following is optionally transmitted from the ticket system to the posting system:
  newly generated ticket ID for the barcode being printed;
  status of the ticket (as similarly discussed above);
  ticket identifier assigned by the posting system (which may be the ticket barcode information);
  customer name;
  event code;
  name of the event;
  event date;
  event time;
  barcode;
  seating section (optionally with a null value if the ticket is a general admission ticket without an assigned seat);
  row (optionally with a null value if the ticket is a general admission ticket without an assigned seat);
  seat (optionally with a null value if the ticket is a general admission ticket without an assigned seat);
  an indication as to whether the ticket is a general admission ticket without an assigned seat;
  face value;
  text to be printed on the ticket.

Optionally, at state 220B, the posting system transmits settlement information to the ticket system, which the ticket system receives optionally then stores in memory for future reference. For example, the settlement information can include some or all of the following data:
  total amount paid for the sale of the tickets;
  total amount to be paid to the seller for the sale of the tickets;
  seller credit method (e.g., checking, ACH (automated clearing house), account credit, manual, electronic);
  encrypted credit card number (which will be stored in association with the purchased ticket so that the purchaser can use the corresponding credit card as an identifier when retrieving the tickets from a "will call" ticket office);
  credit card expiration date;
  certificate used to access decryption.

Optionally, in addition to or instead of transmitting the "raw" ticket data, a ticket image file of the ticket(s) may be transmitted to the third party reseller/ticket system for visual presentation to the buyer. By way of example and not limitation, the image file may be in pdf, tif, png, bmp, or other format.

Optionally, the ticket holder is charged a fee by the posting system, the verification system, and/or the ticket system for the sale. The fee can be a fixed dollar value or a percentage of a sale price, by way of example. The sales information can then be made available to the ticket holder (optionally in substantially real-time) via ticket management user interfaces, such as those discussed elsewhere herein.

As discussed above, if a buyer navigates to the posting system website, and places posted tickets in an online shopping cart, the posting system transmits a notification to the ticket system identifying the tickets (e.g., using the barcodes and/or ticket IDs), an event identifier (e.g., previously assigned via the ticket system), and a reservation time. The ticket system then will place a reservation lock on the corresponding tickets for a time period pending the sale or abandonment of the purchase. Optionally, the posting system can later transmit a message to the ticket system asking for the reservation to be extended. However, if the buyer fails to complete the purchase (e.g., the buyer removes the tickets from the shopping cart, has not completed the purchase within a specified period of time, navigates away from a certain webpage, or otherwise indicates that the buyer is no longer interested in purchasing the tickets), the process proceeds to state 224B, and an "unreserved" notification is transmitted by the posting system to the ticket system (e.g., including an unreserved command, the ticket system barcodes, the event identifier). The ticket system optionally transmits an "unreserved" confirmation message to the posting system.

Figure 2C:
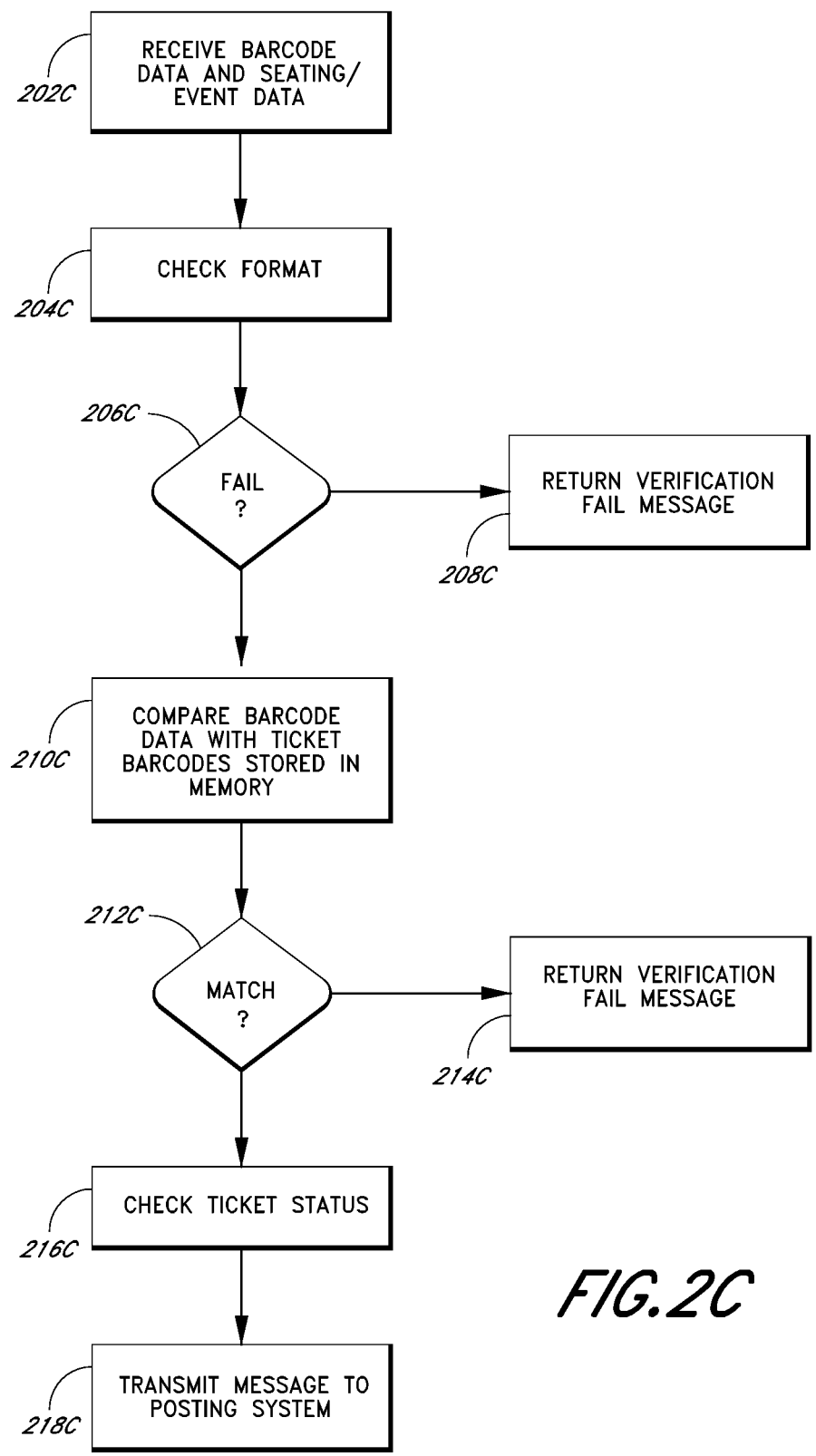

FIG. 2C illustrates an example barcode verification process, which may be executed by the verification system. Not all states need to be reached, the process may be performed in a different order, and states that are illustrated as being performed serially may be performed in parallel. At state 202C, the verification system receives barcode data associated with a ticket. The data may be in the form of text (e.g., an alphanumeric code), or may be in the form of a barcode image. If the data is in the form of a barcode digital image, then barcode decoding software is used to decode the image into corresponding text. The barcode data may be received via a ticket resale posting system, directly from the ticket holder, or via a link to the barcode data provided by the ticket holder or posting system. In addition, the verification system receives event data and seating data. For example, the event data may include some or all of the following information: and event identifier (event ID), an event name (which may be a performer name for concerts, a team name for sporting events, etc.), an event date, an event time, and an event venue. The seating information may include, by way of example, section, row, and seat identifiers, or, for a general admission event, an indication that the ticket is a general admission ticket.

At state 204C, the verification system inspects the barcode format, and determines whether the barcode is using a valid ticket barcode format. For example, the format may relate to the number of characters, the placement of start and stop indicators, the use of headers, etc. In addition, if a checksum is being used, the barcode data is evaluated with respect to the checksum. If, at state 206C, a determination is made that a valid ticket barcode format is not being used and/or if the checksum check fails, the verification process returns a verification failure message (which may be transmitted to the posting system) at state 208C. The verification message may include a ticket status indicating that the barcode will not decode, that the barcode is invalid, or the wrong barcode mode is being used.

If the format and checksum are satisfactory, the process proceeds to state 210C. At state 210C, the barcode data is compared with that stored in a ticket database which stores ticket barcodes. Optionally, the barcode data is only compared with barcodes for tickets for the event identified by the ticket holder.

Optionally instead, the barcode data comparison is not limited to ticket barcodes for the identified event. If a corresponding matching barcode is found, then the event information associated with the matching barcode is compared with the identified event to determine if they match.

At state 212C, the verification system determines whether the barcode data corresponds to a ticket barcode for the corresponding event (e.g., based on the barcode comparison and/or event comparison). If the barcode data fails to correspond to a ticket barcode for the corresponding event, the verification process returns a verification failure message (which may be transmitted to the posting system) at state 214C. For example, the verification failure message may include a status code/text indicating that the seating information failed to match, that the event identifier failed to match, etc.

If the barcode data corresponds to a ticket barcode for the corresponding event, the verification process, the process proceeds to state 216C, and additional ticket status related issues are checked. For example, the additional status issues may affect whether or not the ticket can be posted by the ticket holder for resale. For example, the verification system may check for some or all of the following conditions and/or other conditions: whether the event is an expired event, whether the event data is inaccessible, whether the ticket is for a series seat, whether the posting is for tickets for non-adjacent seats, whether the seats are already locked and/or reserved, whether the event has been cancelled, whether the tickets are already posted, whether the event date has past or whether there is insufficient time before event to process ticket transfer/resale, whether the tickets have not been fully paid for, whether the tickets are complimentary tickets that may not be resold, whether the ticket holder is restricted from reselling tickets, whether the barcode is invalid/no longer active as a result of a resale process or other process, etc.

At state 218C, the verification system transmits a response message to the posting system, the message including the ticket status information that indicates whether the ticket(s) may be posted for resale. The posting system can then post or not post the tickets in accordance with the message(s) received from the ticket system.

Optionally, additional data may be used to verify a ticket is authentic and that the user has the right to sell the ticket. For example, the user may be asked by the resale system to provide the credit card number of the credit card used to originally purchase the ticket. The credit card number (received via the user) can then be transmitted to the ticket system. The ticket system can then verify whether that credit card number was used to originally purchase the ticket (e.g., by comparing the seller provided credit card number with the credit card number stored in a database with an association to the ticket being sold). If the seller supplied credit card number fails to match that used to purchase the ticket, then optionally the verification system so indicates via a message transmitted to the posting system.

Figure 2D:
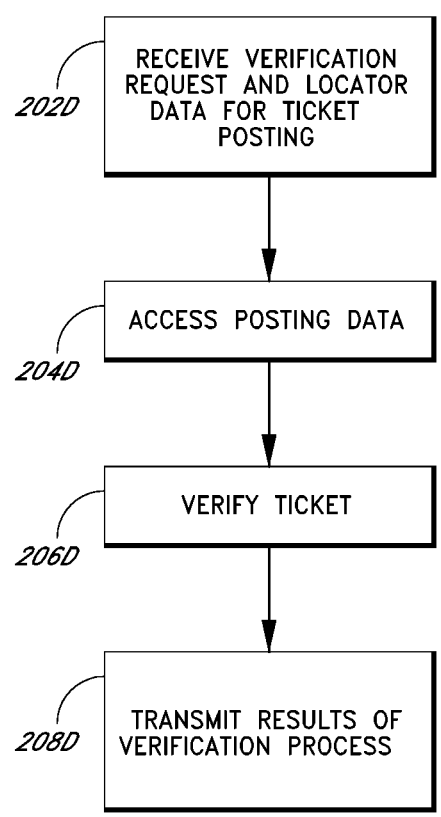

FIG. 2D illustrates another example process. In this example, a seller has posted on a ticket for sale on a website (e.g., a website that offers items for sale via auction and/or via fixed price sales) hosted by a posting system. Optionally, rather then the posting system automatically requesting barcode/ticket document verification, the seller and/or buyer specifically initiates a verification request. In addition, rather than the posting system pushing data to the verification system, the verification system pulls at least certain information from the posting system.

At state 202D, the verification system receives a verification request from the buyer and/or seller. The verification request may be initiated via a verification request control on a user interface provided for display by the posting website or via a control, optionally on the same user interface webpage as the ticket posting. Optionally instead, the verification request may be submitted via a user interface provided for display by the verification system or other related system. Optionally, the requester enters a notification address (e.g., an email address, an SMS address, and instant messaging address) to which the verification result is to be provided. The verification request is accompanied by a posting locator. For example, the posting locator may be an address, such as a URL associated with a webpage on which the tickets are posted for resale. The locator may have been manually entered by the buyer or seller (e.g., by keying in or pasting in the locator address) into a locator field on a form hosted by verification system, or the locator may have been automatically provided by posting system in response to the activation of the verification control.

At state 204D, the verification system accesses the location (e.g., the webpage) associated with the locator address and reads/pulls some or all of the posting information. For example, the verification system may access an image that includes the ticket barcode (which may be an image of one entire side of the ticket or just of the barcode) and/or text corresponding to the barcode. In addition, optionally event data and/or seating data is accessed from the location. The verification system optionally uses a mapping of tag/field names used by the posting system in deciding what data to access and/or how the accessed data is to be used.

For example, the verification system may access from its memory a previously stored mapping of tags/fields for the specific website used to post the tickets, where the mapping indicates what values are associated with the tags/fields. By way of example, the posting system may use the tag/field name "EventName" to list the name of the ticketed event. Similarly, the posting system may use the tag/field name "EventDate" to list the date of the ticketed event. By way of further example, the posting system may use the tag/field names "EventCity", "EventState", "EventVenue" to respectively list the city, state, and venue is which the event is scheduled to take place. By way of still further example, the posting system may use the tag/field names "TicketQuantity", "SeatIdentifier", and "AskingPrice" to respectively list the quantity of tickets being posted, the seat identifiers associated with a given ticket, and the asking price. Of course, other tags/field names may be used.

At state 206D, the verification system performs a verification process, optionally using the process discussed above with respect to FIG. 2C or optionally using other techniques described herein. For example, the verification process can use data obtained from the posting webpage and data from a ticketing database, such as that associated with the original ticket issuing system. At state 208D, the verification system returns the results to the seller and/or buyer. For example, the results may be presented on a webpage served via the posting system or the verification system, or transmitted to an address provided by the requester (e.g., an email, SMS, instant messaging address, or via an audible message to a phone). The results may include some or all of the following information and/or other information:

- an indication as to whether the verification passed or failed (which is optionally provided without specifically indicating why the verification passed or failed, and may reflect one or more reasons as to why the verification passed or failed);
- an indication as to whether the barcode is a valid barcode;
- if barcode is valid, an indication as to what event the barcode is actually associated with (e.g., as determined using data from the original ticket issuer database), including event name, city, venue, date, and/or time;
- if barcode is valid, the actual seat identifier associated with the barcode (e.g., section/row/seat number associated with the barcode as determined using data from the original ticket issuer database);
- if barcode is valid, the actual face value of the ticket (e.g., as determined by a face value accessed from the original ticket issuer database).

Figure 3:
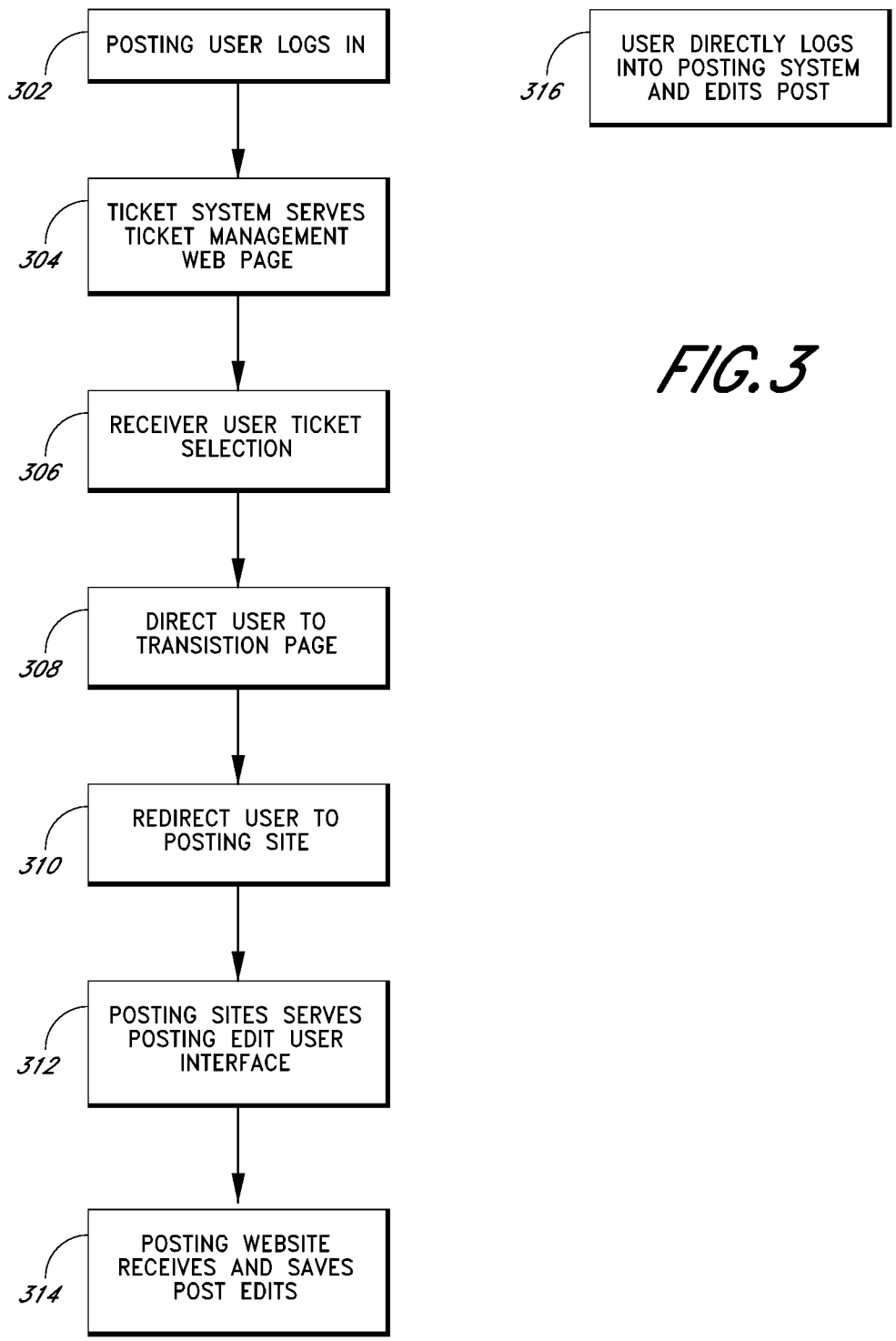
FIG. 3 illustrates an example posting editing process.

FIG. 3 illustrates an example process for editing a posting, wherein the user is navigated from the ticket system website to the posting website (associated with a third party) in order to edit a posting, were the posting website is operated by a separate entity than the ticket system website. At state 302, the user logs into the ticket system via a website operated/hosted by the ticket system. At state 304, the user accesses a ticket management user interface, such as those discussed herein. By way of example, the ticket management may provide the user interface by serving one or more ticket management web pages. The user selects one or more tickets whose postings are to be edited. The user activates an "update" control in order to edit the posting for the selected ticket, wherein the selected tickets are posted for sale on a third party website, and the user is re-directed to the third party website to perform the edit.

At state 306, the user entries/selections are received by the ticket system, which optionally stores the entries/selections in memory. At state 308, the ticket system optionally directs the user browser to a transition page, where the user is informed that user is being transitioned to the third party site and/or other information is provided to the user. If an error occurs during the transition/redirection process (e.g., because the third party posting system is not accessible) the user is so informed via a user interface.

At state 310, the user browser is redirected to the third party posting website, wherein in a login user interface is presented to the user and the user logs in (e.g., by providing a password/user ID). Optionally the ticket holder is automatically logged in, optionally without presenting a log-in user interface.

At state 312, a posting edit user interface hosted by the third party website is presented to the user. At state 314, the user edits the posting (e.g., the asking price, a purchase deadline, the minimum number of the posted tickets that must be purchased, etc.). Once the user has completed the edits (e.g., as indicated by the user activating a "save changes" control or the like), the changes are saved to the third party website database and the changes are reflected in the posting viewable by potential purchasers.

At a later time, at state 316, the user optionally directly accesses and logs into the third party website (without going through the ticket system website) to make additional edits. The edits are then saved in memory.

Figure 4:
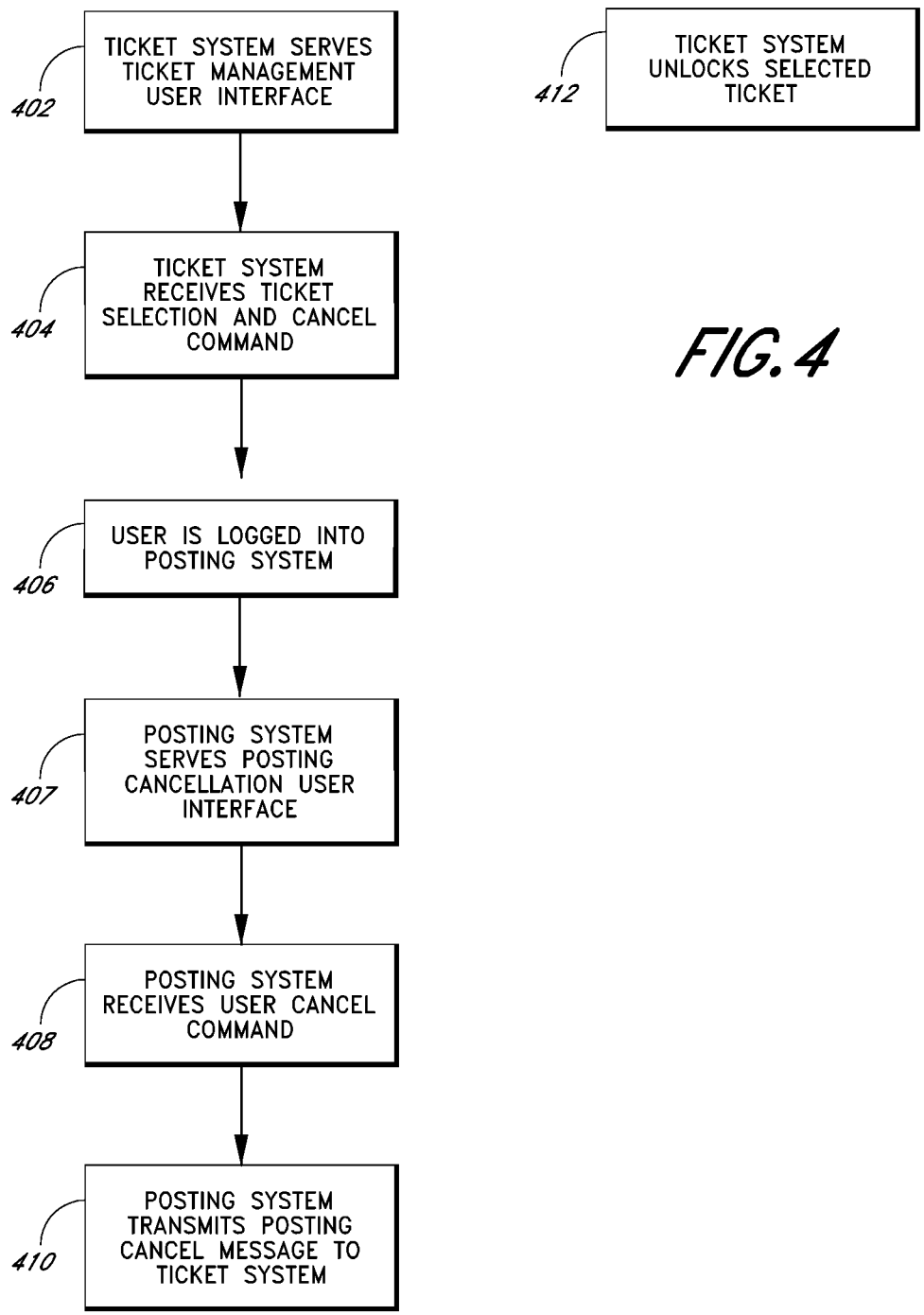
FIG. 4 illustrates an example posting cancellation process.

FIG. 4 illustrates an example posting cancellation process, wherein the posting user is navigating from the ticket system website to the third party posting system website in order to performing the cancellation operation. At state 402, the ticket holder user logs into the ticket system and accesses a ticket management user interface. The ticket management user interface lists the tickets the user has posted for sale via the posting system, as similarly described above. At state 404, the user selects the posted tickets and activates a "cancel" control (e.g., a soft button, link, or menu selection), which is received, and a cancellation indication is optionally stored by the ticket system.

At state 406, a transition user interface is optionally provided for display informing the user that a transition to another operator's website is taking place. Optionally the ticket holder is automatically logged in to the user's account with the third party website (e.g., where the ticket holder browser has the login password and user ID and can populate the login field). Optionally, the user manually logs into the posting system.

At state 407, the posting system serves a user interface (e.g., via a webpage) listing the selected tickets, the user interface including a cancel control. At state 408, the user activates the "cancel" control associated with the selected tickets. The cancel command is received and stored by the posting system. At state 410, the posting system transmits a notification to the ticket system indicating that the posting for the selected tickets has been cancelled. For example, the notification can include some or all of the following information:

an unlock command;
    ticket identifiers associated with the cancelled posting;
    ticket barcodes associated with the cancelled posting;
    an event identifier (e.g., previously assigned via the ticket system);
    an indication as to whether the posting was actively cancelled by the user or whether the posting expired.

At state 412, the ticket system unlocks the selected ticketed (e.g., by recording an "unlocked/available" status flag in the ticket system database), so that the user can transfer or repost the selected tickets for sale. The unlock operation may be performed using the ticket ID and/or the ticket barcode to access the corresponding ticket record. Optionally, rather than first accessing the ticket system website and then being redirected to the posting website, the ticket holder may navigate directly to the posting website in order to cancel a ticket posting.

Optionally, the ticket system transmits a confirmation to the posting system indicating that the cancellation has been noted and that the tickets have been unlocked. For example, the confirmation may include some or all of the following:

an unlock inventory attribute;
    a result indicating whether the posting cancellation/unlock has been successfully performed;
    the ticket identifier provided by the posting system in the cancellation notification;
    the barcode provided by the posting system in the cancellation notification.

The posting system and/or the ticket system optionally transmits a cancellation confirmation to the user (e.g., via an email, SMS message, instant message, webpage, etc.).

FIG. 5A illustrates an example ticket management user interface presented via the ticket system to a user. The example user interface lists an event for which the user has tickets (Yankees vs. Pirates). The example identifies the seating area (section STND2 Row C) and the seats for which the user has tickets. In this example, the user has four seat tickets (seat 2, seat 2, seat 3, and seat 4) in section STND2 Row C. In addition, related items/seats are listed. In this example, parking passes for the Yankees vs. Pirates are listed.

Transaction controls are provided. In this example, a sell control, a forward control, and a transfer and print control are provided. Activation of a transaction control instructs the ticket system as to how the ticket is to be given/offered to another (e.g., via a sale through a third party service, via a transfer/gift to a designated recipient.

FIG. 5B illustrates an example ticket management user interface presented via the ticket system to a user, where certain tickets have already been posted for resale (e.g., via a third party service and/or via the ticket system). The data regarding tickets sold by the third party service may have been transmitted to the ticket system from the posting system, as described above.

The example user interface illustrated in FIG. 5B lists an event for which the user has tickets (Horrible Hyenas). The example identifies the status of seat tickets that the user has previously purchased. In this example, the user interface reports (using information from the database) that user tickets for seats 1 and 2 have been sold, and that a ticket for seat 3 has been sold for $100. The user interface further reports that a ticket for seat 4 is currently posted for sale, and that tickets for seats 5 and 6 are currently posted for sale. In this example, update and cancel links/controls are provided for the tickets currently posted for sale, via which the user can edit the posting (e.g., change the asking price), or cancel a posting (cancel the offer to sell the ticket).

Optionally, less information and options are provided if the ticket is posted on a third party posting service. Thus, for example, if the ticket system determines (via information or lack thereof in the ticket system database) that a ticket is posted for sale on a third party service, optionally the sale price is not reported for a sold ticket. Similarly, if a ticket is posted for sale on a third party service, optionally the user is not provided with the update or cancel controls (e.g., the user is optionally required to perform any cancellation or update via the third party service).

FIG. 5C illustrates yet another example ticket management user interface, including a field which enables the user to navigate to a specific event via a drop down menu that lists the events for which the user purchased tickets. Another field is provided via which the user can select which seat tickets are to be viewed (e.g., by date, status, or type). A notation indicates the positioning of the displayed events in the total number of events, optionally the total within a specified period of time, ("events showing 18-28 of 28"). If a user activates a "sell" control to sell a ticket via a third party site, a pop-up transitional user interface page is displayed, notifying the user that the user are leaving the ticket system website and is being transitioned to an independent website. An "OK" and "Cancel" controls are provided via which the user can approve proceeding with the transitions or can cancel the transition to the independent web site.

Optionally, in order to cancel a posting on a third party website, the user needs to proceed to the third party website, rather than cancel the posting via the ticket system, as similarly described above.

Thus, various example embodiments have been described for validating and verifying documents such as tickets.

Unless otherwise indicated, the functions described herein may be performed by software (e.g., including modules) including executable code and instructions running on one or more systems including one or more computers, such as barcode and/or other authentication computer systems. The software may be stored in computer readable media (e.g., some or all of the following: optical media (e.g., CD-ROM, DVD, Blu-ray, etc.), magnetic media (e.g., fixed or removable magnetic media), semiconductor memory (e.g., RAM, ROM, Flash memory, EPROM, etc.), and/or other types of computer readable media.

The one or more computers can include one or more central processing units (CPUs) that execute program code and process data, non-transitory, tangible memory, including. for example, one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," a wired and/or wireless network interface for accessing an intranet and/or Internet, and/or other interfaces.

In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the systems described herein can also be implemented using general-purpose computers, special purpose computers, terminals, state machines, and/or hardwired electronic circuits.

While various systems are described herein (e.g., a posting system, a verification system, a ticket system, etc.), optionally some are or all of the various systems can be included a single system operated by a single operator.

While the foregoing examples include reference to barcodes, other types of codes, including other types of unique codes assigned to event tickets, may be similarly verified and used to access data stored in memory, such as in databases. For example, other types of alphanumeric and/or machine readable codes may be used.

The example processes described herein do not necessarily have to be performed in the described sequence, and not all states have to be reached or performed.

Unless the context otherwise indicates, the term "field" with respect to a user interface or form is intended to refer to a user entry mechanism via which the user can input data or commands, such as a text field, a menu via which the user can make a selection, etc.

Throughout the description herein, the term "website" is used to refer to a user-accessible server site that implements basic and/or other World Wide Web standards for the coding and transmission of documents, such as hypertextual documents. These standards currently include HTML (the Hypertext Markup Language), which can be used to generate Webpages, and HTTP (the Hypertext Transfer Protocol). It should be understood that the term "site" or "computer system" are not intended to imply a single geographic location, as a Web or other network site can, for example, include multiple geographically-distributed computer systems that are appropriately linked together. Furthermore, while the following description relates to an embodiment utilizing the Internet and related protocols, other networks, such as a network of interactive televisions, wireless phones, and other protocols, may be used as well.

Various embodiments provide for communications between one or more systems (e.g., a verification system, a posting system, etc.) and one or more users (e.g., a purchaser and/or seller). These user communications may be provided to a user terminal (e.g., an Interactive television, a phone, a video game system, a laptop/desktop computer, a device providing Internet access, or other networked device). For example, communications may be provided via Webpages, downloaded documents, email, SMS (short messaging service) message, MMS (multimedia messaging service) message, other forms of electronic communication text-to-speech message, otherwise. Commands and data received by the verification system and the posting system from a user are stored in memory and processed and transformed as discussed herein.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of verifying a ticket, comprising:
   receiving coded data associated with a ticket for a ticket offering posting for a ticket being offered for resale by a first user, that had previously purchased the ticket, for a ticketed event;
   determining, using a computing device, if the received coded data, associated with the ticket offering posting for the ticket being offered for resale, is in accordance with a first specified format;
   determining, via the computing device, if the received coded data, associated with the ticket offering posting for the ticket being offered for resale, corresponds to coded data stored in a data store;
   determining, via the computing device, if event data, including at least an event name, received in association with the coded data, associated with the ticket offering posting for the ticket being offered for resale, corresponds to stored event data, including at least the stored name of the ticketed event, associated with an issued ticket for the event; and
   transmitting, via the computing device, a positive verification indication based at least in part on the determination that:
   the received coded data, associated with the ticket offering posting for the ticket being offered for resale, is in accordance with a first specified format;
   the received coded data, associated with the ticket offering posting for the ticket being offered for resale, corresponds to coded data stored in the data store; and
   the received event data including at least the received event name, associated with the ticket offering posting for the ticket being offered for resale, corresponds to the event data, including at least the stored name of the ticketed event, associated with the issued ticket for the event.

2. The method as defined in claim 1, the method further comprising:
   providing an interface configured to receive seating data, including at least a seat identifier, and event data, including at least a name, manually provided by the first user offering the ticket and/or by a second user seeking to acquire the ticket;
   determining if the received seating data, including at least the seat identifier, corresponds to coded data stored in the data store; and
   wherein the positive verification indication is based, in part, on the determination that the received seating data, including at least the seat identifier, corresponds to coded data stored in the data store.

3. The method as defined in claim 1, the method further comprising:
   receiving a locator, associated with the ticket offering posting of the ticket, from the first user and/or the second user; and
   accessing a third party web resource hosted by a web server associated with the locator;
   accessing from the third party web resource the seating data, including a seat identifier, and the event data, manually provided by the first user and the second user, via the web server;

determine if the received seating data, including the seat identifier, corresponds to seating data stored in the data store; and wherein the positive verification indication is based, in part on, the determination that the received seating data corresponds to the seating data stored in the data store.

4. The method as defined in claim 1, the method further comprising:

determining if the received coded data is associated with a ticket that is not to be transferred via at least a first transaction type; and transmitting a transfer right indication based at least in part on the determination that received coded data is associated with a ticket that may be transferred via at least a first transaction type.

5. The method as defined in claim 1, wherein the coded data is barcode data.

6. The method as defined in claim 1, the method further comprising:

providing a user interface via which a user can access ticket data related to tickets acquired by the user, the ticket data including at least:

an event name associated with at least one ticket previously acquired by the user;

an indication as to whether the user had transferred at least one ticket via a service offered by the first website; and an indication as to whether the user had transferred at least one ticket via a service offered by a different website.

7. The method as defined in claim 1, the method further comprising determining if the ticket is transferable based at least in part on an indication that the event date has passed or that there is insufficient time before the event to process a ticket transfer.

8. The method as defined in claim 1, the method further comprising determining if the ticket is transferable based at least in part on an indication stored in non-transitory memory that the event is cancelled.

9. The method as defined in claim 1, the method further comprising determining if the ticket is transferable based at least in part on an indication stored in non-transitory memory that ticket is being offered by the a user with a second ticket wherein the seat associated with the ticket is not adjacent to a seat associated with the second ticket.

10. The method as defined in claim 1, the method further comprising determining if the ticket is transferable based at least in part on an indication stored in non-transitory memory that the ticket has already been transferred by a user.

11. The method as defined in claim 1, the method further comprising determining if the ticket is transferable based at least in part on an indication stored in non-transitory memory that the ticket is a complimentary ticket.

12. A verification system comprising:

an interface configured to receive coded data associated with a ticket offering posting for a ticket being offered for resale by a first user that had previously purchased the ticket, for a ticketed event;

a data store that stores:

coded data for issued tickets associated for the ticketed event;

event data, including at least a name of the ticketed event, associated with the issued tickets;

seating data associated with the issued tickets;

non-transitory memory storing program code, that when executed by a computing system is configured to cause the computing system to:

determine if the received coded data, associated with the ticket offering posting for the ticket being offered for resale, is in accordance with a first specified format;

determine if the received coded data, associated with the ticket offering posting for the ticket being offered for resale, corresponds to coded data stored in the data store;

determine if event data, including at least an event name, received in association with the coded data, associated with the ticket offering posting for the ticket being offered for resale, corresponds to the stored event data, including at least the stored name of the ticketed event, associated with the issued tickets for the event;

transmit a positive verification indication based at least in part on the determination that:

the received coded data, associated with the ticket offering posting for the ticket being offered for resale, is in accordance with a first specified format;

the received coded data, associated with the ticket offering posting for the ticket being offered for resale, corresponds to coded data stored in the data store; and the received event data including at least the received event name, associated with the ticket offering posting for the ticket being offered for resale, corresponds to the event data, including at least the stored name of the ticketed event, associated with the issued tickets for the event.

13. The verification system as defined in claim 12, wherein the program code is further configured to cause the computing system to:

provide an interface configured to receive seating data, including at least a seat identifier, and event data, including at least a name, manually provided by the first user offering the ticket and/or by a second user seeking to acquire the ticket;

determine if the received seating data, including at least the seat identifier, corresponds to seating data stored in the data store; and wherein the positive verification indication is based, in part on the determination that the received seating data, including at least the seat identifier, corresponds to the seating data stored in the data store.

14. The verification system as defined in claim 12, wherein the program code is further configured to cause the computing system to:

receive a locator, associated with the ticket offering posting of the ticket, from the first user and/or the second user; and access a third party web resource hosted by a web server associated with the locator, wherein the third party web resource is operated by an entity different than the verification system;

access from the third party web resource the seating data, including at least a seat identifier, and the event data, manually provided by the first user and/or the second user, via the web server;

determine if the received seating data, including at least the seat identifier, corresponds to the seating data stored in the data store; and wherein the positive verification indication is based, in part on, the determination that the received seating data corresponds to the seating data stored in the data store.

15. The verification system as defined in claim 12, wherein the program code is further configured to cause the computing system to:

determine if the received coded data is associated with a ticket that is not to be transferred via at least a first transaction type; and transmit a transfer right indication based at least in part on the determination that received coded data is associated with a ticket that may be transferred via at least a first transaction type.

16. The verification system as defined in claim 12, wherein the coded data is barcode data.

17. The verification system as defined in claim 12, wherein the verification system is associated with a first website that enables a user to acquire and transfer tickets and provides a ticket management user interface via which a user can access ticket data related to tickets acquired by the user, the ticket data including at least:

an event name associated with at least one ticket previously acquired by the user;

an indication as to whether the user had transferred at least one ticket via a service offered by the first website; and an indication as to whether the user had transferred at least one ticket via a service offered by a different website.

18. The verification system as defined in claim 12, wherein the program code is further configured to cause the computing system to determine if the ticket is transferable based at least in part on an indication that the event date has passed or that there is insufficient time before the event to process a ticket transfer.

19. The verification system as defined in claim 12, wherein the program code is further configured to cause the computing system to determine if the ticket is transferable based at least in part on an indication stored in non-transitory memory that the event is cancelled.

20. The verification system as defined in claim 12, wherein the program code is further configured to cause the computing system to determine if the ticket is transferable based at least in part on an indication stored in non-transitory memory that ticket is being offered by the a user with a second ticket wherein the seat associated with the ticket is not adjacent to a seat associated with the second ticket.

21. The verification system as defined in claim 12, wherein the program code is further configured to cause the computing system to determine if the ticket is transferable based at least in part on an indication stored in non-transitory memory that the ticket has already been transferred by a user.

22. The verification system as defined in claim 12, wherein the program code is further configured to cause the computing system to determine if the ticket is transferable based at least in part on an indication stored in non-transitory memory that the ticket is a complimentary ticket.

23. The verification system as defined in claim 12, wherein the ticket offering posting is posted at a third party networked site.

24. A barcode verification system comprising:

a barcode interface configured to receive barcode data associated with a barcode of a ticket associated with a ticketed event, wherein the barcode data was obtained via a barcode imaging device at a first location or was manually entered;

an interface configured to receive seating data and event data, respectively including at least a seat identifier and an event name in text form, manually provided by a first user, for a ticket offering posting to be provided for display to potential ticket purchasers, offering the ticket and/or provided by a second user seeking to acquire the ticket via the ticket offering posting after the ticket offering posting is provided for display to at least second user;

a data store that stores:
barcode data for issued tickets associated for the ticketed event;
event data, including at least an event name corresponding to the ticketed event, associated with the issued tickets;
seating data associated with the issued tickets;
transfer permission data associated with the issued tickets;

non-transitory memory that stores code, that when executed by a computing system is configured to cause the computing system to:
determine if the received barcode data is in accordance with a first specified format;
determine if the received barcode data corresponds to barcode data stored in the data store;
when the received barcode data corresponds to barcode data stored in the data store, determine if the received event data, including at least the first user and/or second user supplied event name, corresponding to that of the ticket offering posting, corresponds to the event data, including at least the stored event name corresponding to the ticketed event, associated with the issued tickets for the event;
determine if the received seating data, including at least the first user and/or second user supplied seat identifier, corresponding to that of the ticket offering posting, corresponds to the seating data stored in the data store;
determine if the received barcode data is associated with a ticket that is not to be transferred via at least a first transaction type;
transmit a positive verification and transfer right indication based at least in part on the determination that:
the received barcode data is in accordance with a first specified format;
the received barcode data corresponds to barcode data stored in the data store;
the received event data, including at least the first user and/or second user supplied event name, corresponding to the ticket offering posting, corresponds to the event data, including at least the stored event name corresponding to the ticketed event, associated with the issued tickets for the event; and
the received seating data, including at least the first user and/or second user supplied seat identifier, corresponding to that of the ticket offering posting, corresponds to the seating data stored in the data store.

25. The barcode verification system as defined in claim 24, further comprising a barcode reader system.

26. The barcode verification system as defined in claim 24, wherein the barcode verification system is associated with a first website that enables a user to acquire and transfer tickets and provides a ticket management user interface via which a user can access ticket data related to tickets acquired by the first user, the ticket data including at least:

an event name associated with at least one ticket previously acquired by the first user;

an indication as to whether the first user had transferred at least one ticket via a service offered by the first website; and an indication as to whether the first user had transferred at least one ticket via a service offered by a different website.

27. The barcode verification system as defined in claim 24, wherein the code is configured to cause the computing system to:
   receive a locator, associated with the ticket offering posting of the ticket, from the first user and/or the second user; and
   access a third party web resource hosted by a web server associated with the locator, wherein the third party web resource is operated by an entity different than the barcode verification system;
   access from the third party web resource the seating data and the event data, manually provided by the first user and/or the second user, via the web server.

28. The barcode verification system as defined in claim 24, wherein the code is configured to cause the computing system to determine if the ticket is transferable based at least in part on an indication that the event date has passed or that there is insufficient time before the event to process a ticket transfer.

29. The barcode verification system as defined in claim 24, wherein the code is configured to cause the computing system to determine if the ticket is transferable based at least in part on an indication stored in non-transitory memory that the event is cancelled.

30. The barcode verification system as defined in claim 24, wherein the code is configured to cause the computing system to determine if the ticket is transferable based at least in part on an indication stored in non-transitory readable memory that ticket is being offered by the first user with a second ticket wherein the seat associated with the ticket is not adjacent to a seat associated with the second ticket.

31. The barcode verification system as defined in claim 24, wherein the code is configured to cause the computing system to determine if the ticket is transferable based at least in part on an indication stored in non-transitory memory that the ticket has already been transferred by the first user.

32. The barcode verification system as defined in claim 24, wherein the code is configured to cause the computing system to determine if the ticket is transferable based at least in part on an indication stored in non-transitory memory that the ticket is a complimentary ticket.

33. The barcode verification system as defined in claim 24, wherein the ticket offering posting is posted at a third party networked site.

34. A non-transitory, tangible computer readable memory storing program code that when executed by a computing system is configured to cause the computing system to perform verification operations comprising:
   receive barcode data associated with a barcode of a ticket associated with a ticketed event;
   receive seating data and event data manually provided by a first user offering the ticket, for a ticket offering posting to be provided for display to potential ticket purchasers, and/or by a second user seeking to acquire the ticket via the ticket offering posting, the seating data and event data, provided by the first and/or second user, respectively including at least a seat identifier and an event name;
   store in a data store:
      barcode data for issued tickets associated for the ticketed event;
      event data, including at least an event name corresponding to the ticketed event, associated with the issued tickets;
      seating data associated with the issued tickets;
      transfer permission data associated with the issued tickets;
   determine if the received barcode data is in accordance with a first specified format;
   determine if the received barcode data corresponds to barcode data stored in the data store;
   when the received barcode data corresponds to barcode data stored in the data store, determine if the received event data, including at least the first user and/or the second user supplied event name, corresponding to that of the ticket offering posting, corresponds to the event data, including at least the stored event name corresponding to the ticketed event, associated with the issued tickets for the event;
   determine if the received seating, including at least the first user and/or second user supplied seat identifier, corresponding to that of the ticket offering posting, corresponds to the seating data stored in the data store;
   determine if the received barcode data is associated with a ticket that is not to be transferred via at least a first transaction type;
   transmit a positive verification and transfer right indication based at least in part on the determination that:
      the received barcode data is in accordance with a first specified format;
      the received barcode data corresponds to barcode data stored in the data store;
      the received event data, including at least the first user and/or second user supplied event name, corresponding to the ticket offering posting, corresponds to the event data, including at least the stored event name corresponding to the ticketed event, associated with the issued tickets for the event; and
      the received seating data, including at least the first user and/or second user supplied seat identifier, corresponding to that of the ticket offering posting, corresponds to the seating data stored in the data store.

35. The non-transitory, tangible computer readable memory as defined in claim 34, wherein the program code is configured to cause the computing system to receive the barcode data via a barcode reader system and/or via manual entry.

36. The non-transitory, tangible computer readable memory as defined in claim 34, wherein the program code is configured to cause the computing system to access and provide to the first user with:
   an event name associated with at least one ticket previously acquired by the first user;
   an indication as to whether the first user had transferred at least one ticket via a service offered by the first website; and
   an indication as to whether the first user had transferred at least one ticket via a service offered by a different website that a website that hosts the program code.

37. The non-transitory, tangible computer readable memory as defined in claim 34, wherein the program code is configured to cause the computing system to:
   receive a locator associated with the ticket offering posting of the ticket, from the first user and/or the second user; and
   access a third party web resource hosted by a web server associated with the locator;
   access from the third party web resource the seating data and the event data manually provided by the first user and/or the second user, via the web server.

38. The non-transitory, tangible computer readable memory as defined in claim 34, wherein the program code is configured to cause the computing system to determine if the ticket is transferable based at least in part on an indication stored in computer readable memory that the event date has passed or that there is insufficient time before the event to process a ticket transfer.

39. The non-transitory, tangible computer readable memory as defined in claim 34, wherein the program code is configured to cause the computing system to determine if the ticket is transferable based at least in part on an indication stored in computer readable memory that the event is cancelled.

40. The non-transitory, tangible computer readable memory as defined in claim 34, wherein the program code is configured to cause the computing system to determine if the ticket is transferable based at least in part on an indication stored in computer readable memory that ticket is being offered by the first user with a second ticket wherein the seat associated with the ticket is not adjacent to a seat associated with the second ticket.

41. The non-transitory, tangible computer readable memory as defined in claim 34, wherein the program code is configured to cause the computing system to determine if the ticket is transferable based at least in part on an indication stored in computer readable memory that the ticket has already been transferred by the first user.

42. The non-transitory, tangible computer readable memory as defined in claim 34, wherein the program code is configured to cause the computing system to determine if the ticket is transferable based at least in part on an indication stored in computer readable memory that the ticket is a complimentary ticket.

* * * * *